US009252648B2

United States Patent
Furukawa et al.

(10) Patent No.: US 9,252,648 B2
(45) Date of Patent: Feb. 2, 2016

(54) POWER GENERATOR AND POWER GENERATING SYSTEM

(71) Applicant: MITSUMI ELECTRIC CO., LTD., Tokyo (JP)

(72) Inventors: Kenichi Furukawa, Sagamihara (JP); Kensuke Yamada, Tachikawa (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 232 days.

(21) Appl. No.: 14/062,543

(22) Filed: Oct. 24, 2013

(65) Prior Publication Data

US 2014/0117785 A1  May 1, 2014

(30) Foreign Application Priority Data

Oct. 29, 2012  (JP) ................................ 2012-238012

(51) Int. Cl.
| | |
|---|---|
| H02K 35/04 | (2006.01) |
| H02K 1/06 | (2006.01) |
| H02K 35/02 | (2006.01) |
| H02K 35/00 | (2006.01) |
| H02K 5/26 | (2006.01) |
| H02K 7/18 | (2006.01) |

(52) U.S. Cl.
CPC .................. *H02K 35/00* (2013.01); *H02K 5/26* (2013.01); *H02K 7/1876* (2013.01)

(58) Field of Classification Search
CPC ........... H02K 1/06; H02K 35/00; H02K 5/26; H02K 7/1876
USPC .................................................. 310/15, 12.12
See application file for complete search history.

(56) References Cited

U.S. PATENT DOCUMENTS

| | | | |
|---|---|---|---|
| 3,956,895 A | 5/1976 | Noble et al. | |
| 5,647,217 A | 7/1997 | Penswick et al. | |
| 7,170,205 B2 * | 1/2007 | Won et al. ......... | 310/36 |
| 2006/0001324 A1 * | 1/2006 | Won et al. ......... | 310/81 |
| 2012/0072150 A1 * | 3/2012 | Furukawa et al. .............. | 702/65 |
| 2012/0206338 A1 * | 8/2012 | Furukawa et al. ............ | 345/156 |
| 2012/0262256 A1 * | 10/2012 | Furukawa et al. ............ | 335/106 |

(Continued)

FOREIGN PATENT DOCUMENTS

| | | | | |
|---|---|---|---|---|
| EP | 474101 A1 * | 3/1992 | ............ | G04C 10/00 |
| FR | 2825768 A1 * | 12/2002 | ............ | F16F 15/00 |
| FR | 2825769 A1 * | 12/2002 | ............ | F16F 15/03 |

(Continued)

*Primary Examiner* — Alex W Mok
(74) *Attorney, Agent, or Firm* — Marger Johnson

(57) ABSTRACT

A power generator 100 of the present invention is configured to be used in a state that the power generator 100 is fixedly attached to a vibrating body formed of a magnetic material. The power generator 100 includes a main unit 1 having a power generating unit 10 configured to generate electric power by utilizing vibration and a base 23 having one surface on which the power generating unit 10 is supported and another surface 230 opposed to the one surface; and at least one permanent magnet 911 disposed on the side of the other surface 230 of the base 23 in a state that the permanent magnet 911 can be displaced or deformed in a thickness direction of the base 23. When the main unit 1 is fixedly attached to the vibrating body through an attachment 9 including the permanent magnet 911, the main unit 1 is configured to generate the electric power by utilizing vibration of the vibrating body.

20 Claims, 14 Drawing Sheets

(56) References Cited

U.S. PATENT DOCUMENTS

2012/0262263 A1* 10/2012 Furukawa et al. ............ 336/30
2013/0099600 A1* 4/2013 Park ............................... 310/15
2014/0103751 A1* 4/2014 Furukawa et al. ............ 310/25

FOREIGN PATENT DOCUMENTS

| JP | 10074426 A * | 3/1998 | ............ H01H 13/20 |
| JP | 2011-172352 | 9/2011 | |
| WO | WO 02099306 A1 * | 12/2002 | ............... F16F 1/32 |

* cited by examiner

POWER GENERATOR AND POWER GENERATING SYSTEM

CROSS REFERENCE TO RELATED APPLICATION

This application claims priority to Japanese patent application no. 2012-238012, filed Oct. 29, 2012, herein incorporated by reference.

BACKGROUND OF THE INVENTION

1. Field of the Invention

The present invention relates to a power generator and a power generating system.

2. Description of the Prior Art

Recently, various power generators to be used in a state that the power generators are fixedly attached to ducts are developed in order to achieve space-saving and efficient power generation. Such power generators can generate electric power by utilizing vibration of the ducts. For example, see a patent document 1 (JP 2011-172352A). The patent document 1 discloses a power generator to be used in a state that the power generator is fixedly attached to a duct by using attachments. Each of the attachments can fixedly attach the power generator on the duct by using screws.

In such method using the attachments disclosed in the patent document 1, it is required to use additional assemblies and to ensure spaces for fixation of the screws when the power generator is fixedly attached to the duct. Further, the number of processes for fixedly attaching the power generator to the duct increases because it is necessary to screw the screws for the fixation. Furthermore, once the power generator is fixedly attached to the duct by such attachment, processes for removing the power generator from the duct become difficult because it is necessary to loosen the screws.

Alternatively, it is possible to fixedly attach the power generator to the duct by using a double-coated adhesive tape. In this method, there is a concern that fixing strength of the double-coated adhesive tape is reduced by aged deterioration due to long term temperature variation, vibration, influence of gravity and the like.

Even in a case where an adhesive agent is used as an alternative to the double-coated adhesive tape, there is a concern that fixing strength of the adhesive agent is reduced by repeated stress due to the vibration. Further, once the power generator is fixedly attached to the duct by using the adhesive agent, it is extremely difficult to remove the power generator from the duct.

SUMMARY OF THE INVENTION

The present invention has been made in view of the problems mentioned above. Accordingly, it is an object of the present invention to provide a power generator and a power generating system which can be fixedly attached to a vibrating body in an easy and stable way and make the process for removing the power generator from the vibrating body easy without any difficulties.

In order to achieve the object, the present invention is directed to a power generator configured to be used in a state that the power generator is fixedly attached to a vibrating body formed of a magnetic material. The power generator comprises a main unit including a power generating unit configured to generate electric power by utilizing vibration and a support board having one surface on which the power generating unit is supported and another surface opposed to the one surface; and at least one permanent magnet disposed on the side of the other surface of the support board so that the permanent magnet can be displaced or deformed in a thickness direction of the support board. When the main unit is fixedly attached to the vibrating body through an attachment including the permanent magnet, the main unit is configured to generate the electric power by utilizing vibration of the vibrating body.

In the power generator according to the present invention, it is preferred that the vibrating body has a deformable plate-like portion formed of the magnetic material and the vibrating body is configured to be vibrated by deformation of the plate-like portion. Further, it is preferred that the power generator is used in a state that the power generator is fixedly attached to the plate-like portion of the vibrating body.

In the power generator according to the present invention, it is preferred that a magnetic attraction between the permanent magnet and the vibrating body is larger than a weight of the power generator.

In the power generator according to the present invention, it is preferred that the attachment includes a mounting mechanism for mounting the permanent magnet to the other surface of the support board so that the permanent magnet can be displaced in the thickness direction of the support board.

In the power generator according to the present invention, it is preferred that the mounting mechanism has flexibility and the mounting mechanism has a sheet member for holding the permanent magnet and a yoke disposed between the sheet member and the permanent magnet to fix the permanent magnet relative to the sheet member.

In the power generator according to the present invention, it is preferred that the vibrating body has a curved portion and the power generator is used so state that the power generator is fixedly attached to the curved portion of the vibrating body by using the permanent magnet.

In the power generator according to the present invention, it is preferred that the at least one permanent magnet includes a plurality of permanent magnets and the sheet member has a fixed portion fixed on the other surface of the support board and a plurality of arm portions respectively having one end portion integrally formed with the fixed portion, another end portion opposite to the one end portion so as to outwardly extend from the fixed portion and holding portions holding the permanent magnets on the other end portions.

In the power generator according to the present invention, it is preferred that each of the arm portions has a length allowing the holding portions of the arm portions to locate outside of the main unit in a planer view when the power generator is attached to a planation surface.

In the power generator according to the present invention, it is preferred that the arm portions include a plurality of first arm portions respectively having a first length and a plurality of second arm portions respectively having a second length shorter than the first length of each of the first arm portions.

In the power generator according to the present invention, it is preferred that the arm portions are configured so that each of the second arm portions is located between the first arm portions.

In the power generator according to the present invention, it is preferred that the each of the arm portions is arranged in a circumferential direction of the fixed portion at substantially regular intervals.

In the power generator according to the present invention, it is preferred that the mounting mechanism has a holding portion holding the permanent magnet and a fixation mechanism fixing the holding portion on the other surface of the support board in a state that the holding portion can be displaced relative to the support board in the thickness direction of the support board.

In the power generator according to the present invention, it is preferred that a through-hole is formed in the holding portion, the fixation mechanism has a male screw and a female screw formed in the support board so as to be screwed with the male screw through the through-hole, and the fixation mechanism is configured to loosely fit the holding portion relative to the support board.

In the power generator according to the present invention, it is preferred that the fixation mechanism further has an elastic body disposed between the holding portion and the support board.

In the power generator according to the present invention, it is preferred that the main unit further has a cylindrical portion provided on the side of the other surface of the support board so as to surround the power generating unit and a female screw configured to be screwed with the male screw is formed on the cylindrical portion.

In the power generator according to the present invention, it is preferred that the fixation mechanism has a spherical head formed at one side of the support board and the holding portion and an engaging concave portion formed at the other side of the support board, and the holding portion is configured to be pivotally engaged with the spherical head.

In the power generator according to the present invention, it is preferred that the holding portion is formed of a yoke formed of a magnetic material.

In the power generator according to the present invention, it is preferred that the at least one permanent magnet includes a plurality of permanent magnets and the permanent magnets are arranged along with an outer periphery of the support board.

In the power generator according to the present invention, it is preferred that the at least one permanent magnet includes three permanent magnets arranged so as to be rotationally symmetric with each other.

In the power generator according to the present invention, it is preferred that the power generator further includes a sheet member provided on one side of the permanent magnet opposed to another side of the permanent magnet facing to the main unit and having a function of preventing the main unit from being slid relative to the vibrating body.

In the power generator according to the present invention, it is preferred that the permanent magnet is formed of a magnet sheet having flexibility and configured to be displaced in the thickness direction of the support board.

In the power generator according to the present invention, it is preferred that the vibrating body has a curved portion formed of the magnetic material and the power generator is used in a state that the power generator is fixedly attached to the curved portion of the vibrating body through the magnet sheet.

In the power generator according to the present invention, it is preferred that the magnet sheet has a size allowing an outer periphery of the magnet sheet to locate outside of the main unit when the power generator is attached to a planation surface.

In the power generator according to the present invention, it is preferred that the magnet sheet has a plurality of slits extending from the outer periphery of the magnet sheet toward a proximal portion of the magnet sheet on which the main unit is attached.

In the power generator according to the present invention, it is preferred that the plurality of slits are formed so as to be arranged in a circumferential direction of the magnet sheet at substantially regular intervals.

In the power generator according to the present invention, it is preferred that each of the slits has a width gradually increasing from a proximal portion of the magnet sheet to the outer periphery of the magnet sheet.

In the power generator according to the present invention, it is preferred that the magnet sheet is obtained by forming a material containing a magnet material and an elastomeric material.

In the power generator according to the present invention, it is preferred that the other surface of the support board is a curved convex surface.

In order to achieve the object, the present invention is directed to a power generating system. The power generating system includes the power generator described above; and a vibrating body to which the power generator is fixedly attached. In this power generating system, the vibrating body is formed of a magnetic material.

In the power generator according to the present invention, it is preferred that the power generator further includes a housing. Further, it is preferred that the power generating unit has a magnet disposed in the housing in a state that the magnet can be displaced in a magnetization direction thereof; a coil disposed in the housing so as to surround the magnet without contacting with the magnet; a coil holding portion disposed between the magnet and the housing, the coil holding portion holding the coil in a state that the coil can be displaced relative to the magnet in the magnetization direction of the magnet; and a pair of leaf springs disposed in the housing so as to be opposed to each other through at least the magnet, the coil and the coil holding portion. In this power generator, each of the leaf springs has first spring portions coupling the housing with the coil holding portion and second spring portions coupling the coil holding portion with the magnet.

In the power generator according to the present invention, it is preferred that each of the leaf springs includes a first circular portion; a second circular portion arranged on the inner side of the first circular portion concentrically with the first circular portion and coupled with the first circular portion through the first spring portions; and a third circular portion arranged on the inner side of the second circular portion concentrically with the second circular portion and coupled with the second circular portion through the second spring portions. In this power generator, the housing holds the first circular portions of the leaf springs, the coil holding portion is supported between the second circular portions of the leaf springs and the magnet is supported between the third circular portions of the leaf springs.

In the power generator according to the present invention, it is preferred that each of the first spring portions of the leaf springs has an arch-shaped portion extending along with a circumferential direction of the first circular portion and the second circular portion so as to couple the first circular portion with the second circular portion.

In the power generator according to the present invention, it is preferred that each of the second spring portions of the leaf springs has an arch-shaped portion extending along with a circumferential direction of the second circular portion and the third circular portion so as to couple the second circular portion with the third circular portion.

In the power generator according to the present invention, it is preferred that each of the leaf springs has a rotationally symmetrical shape around a central axis thereof.

Effect of the Invention

According to the present invention, it is possible to fixedly attach the power generator in an easy and stable way and make the process for removing the power generator from the vibrating body easy without any difficulties.

DETAILED DESCRIPTION OF THE PREFERRED EMBODIMENTS

Hereinafter, power generators according to a first embodiment to a fifth embodiment of the present invention will be described below with reference to the accompanying drawings.

<First Embodiment>

Description will be first given to a power generator 100 according to the first embodiment of the present invention.

Figure 1:
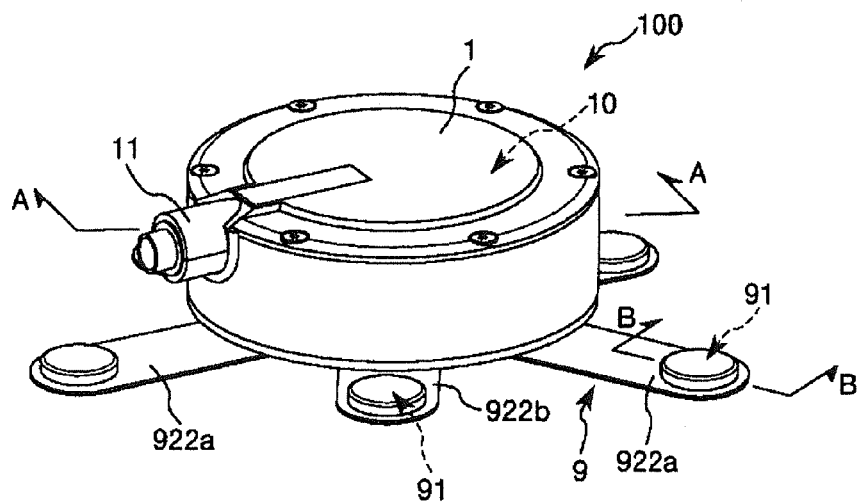
FIG. 1 is a perspective view showing a power generator according to a first embodiment of the present invention.
Figure 2:
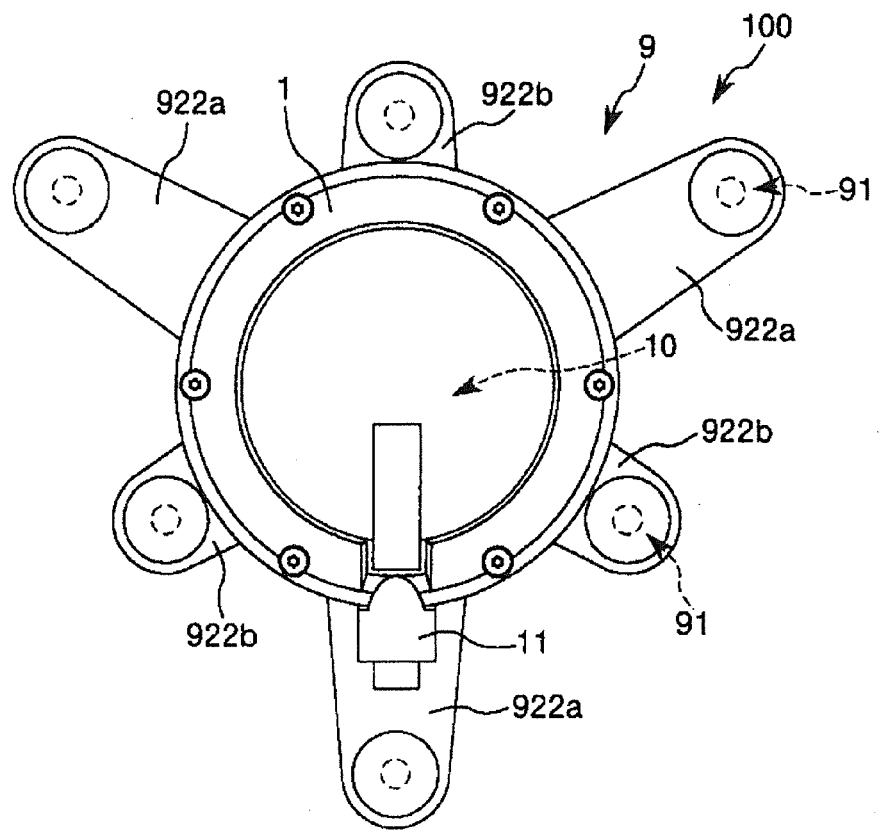
FIG. 2 is a planar view showing the power generator shown in FIG. 1.
Figure 3:
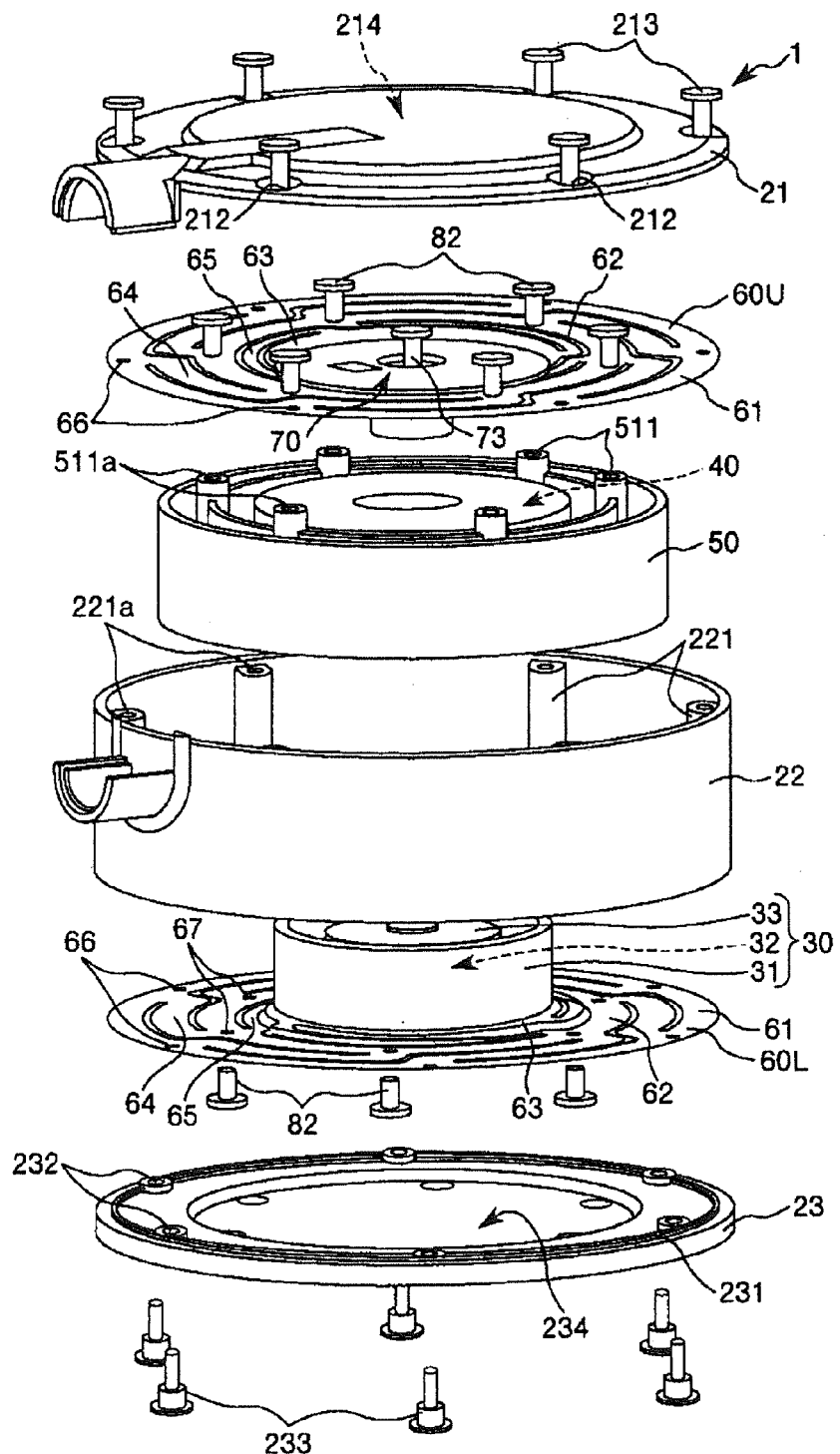
FIG. 3 is an exploded perspective view showing a main unit of the power generator shown in FIG. 1.
Figure 4:
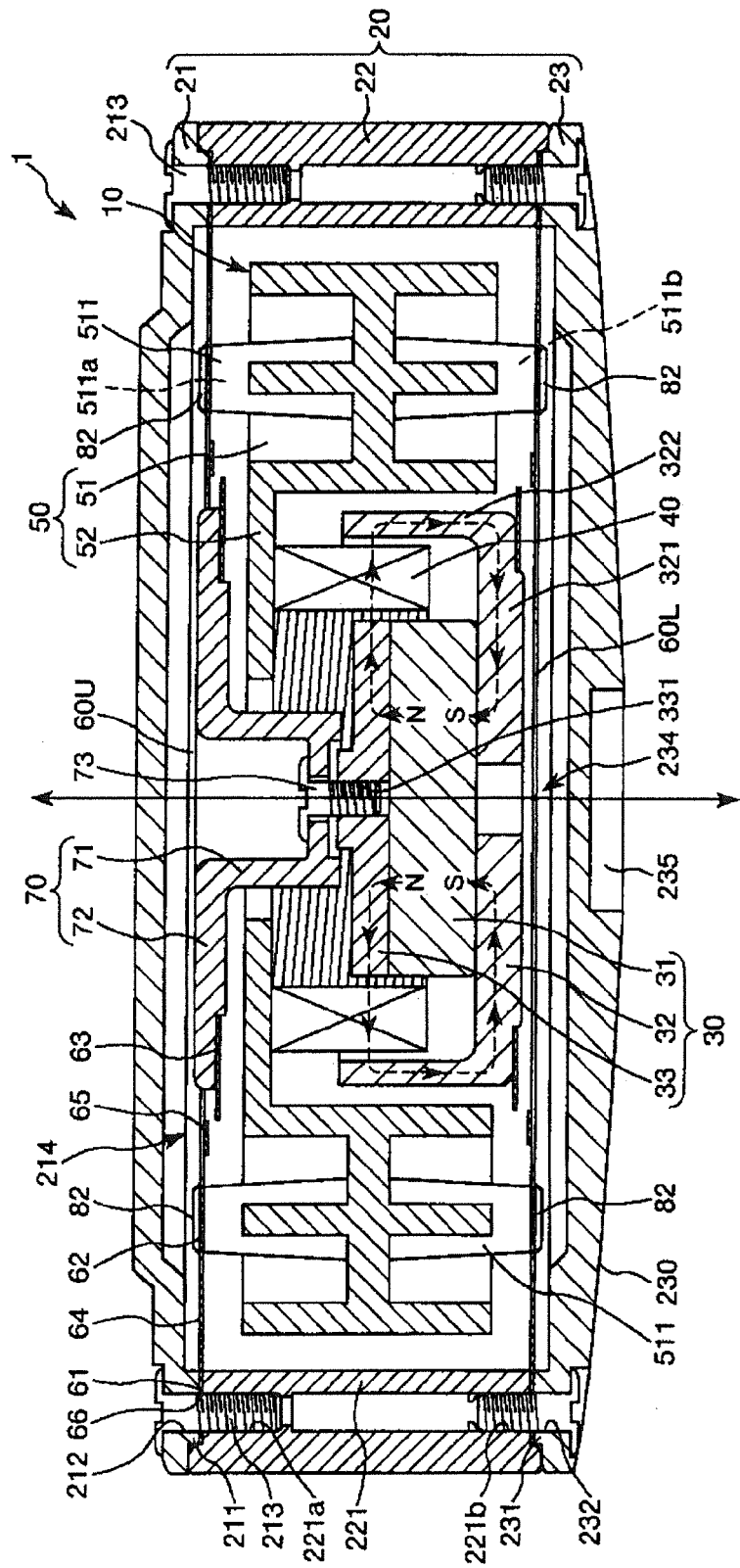
FIG. 4 is a cross-sectional view taken along with an A-A line shown in FIG. 1 (a vertical cross-sectional view showing the main unit shown in FIG. 3).
Figure 5:
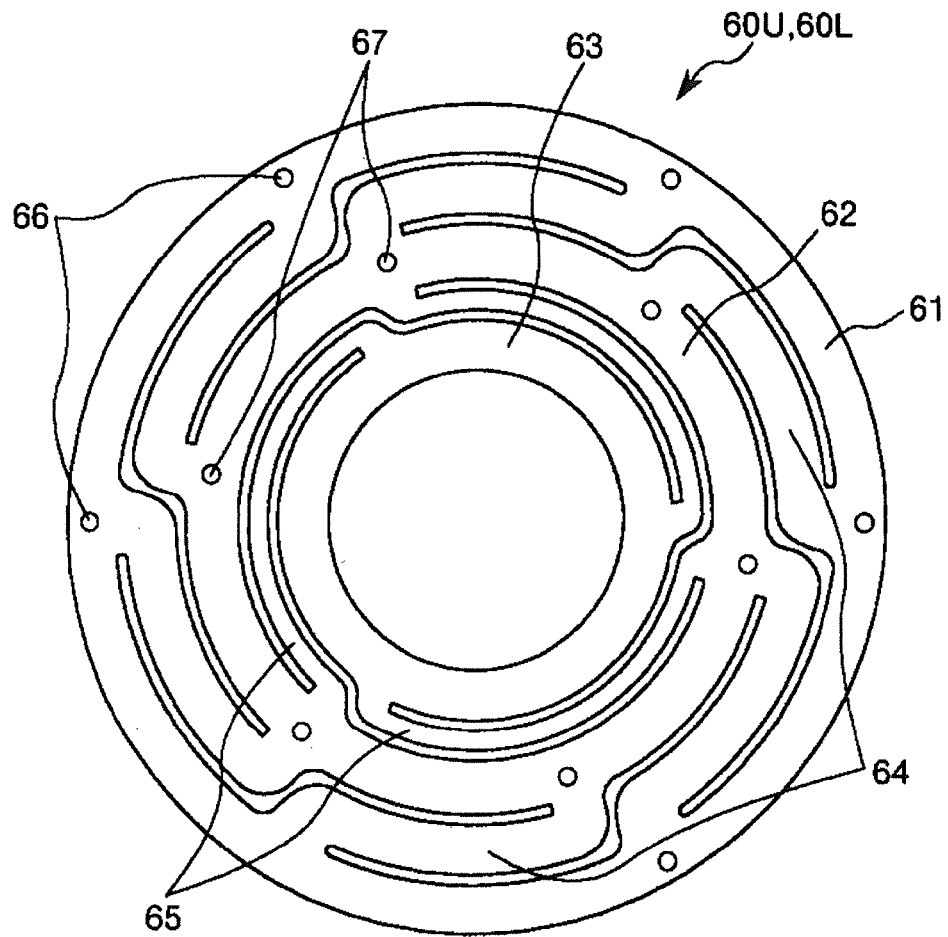
FIG. 5 is a planar view showing a leaf spring included in the main unit shown in FIG. 3.
Figure 6:
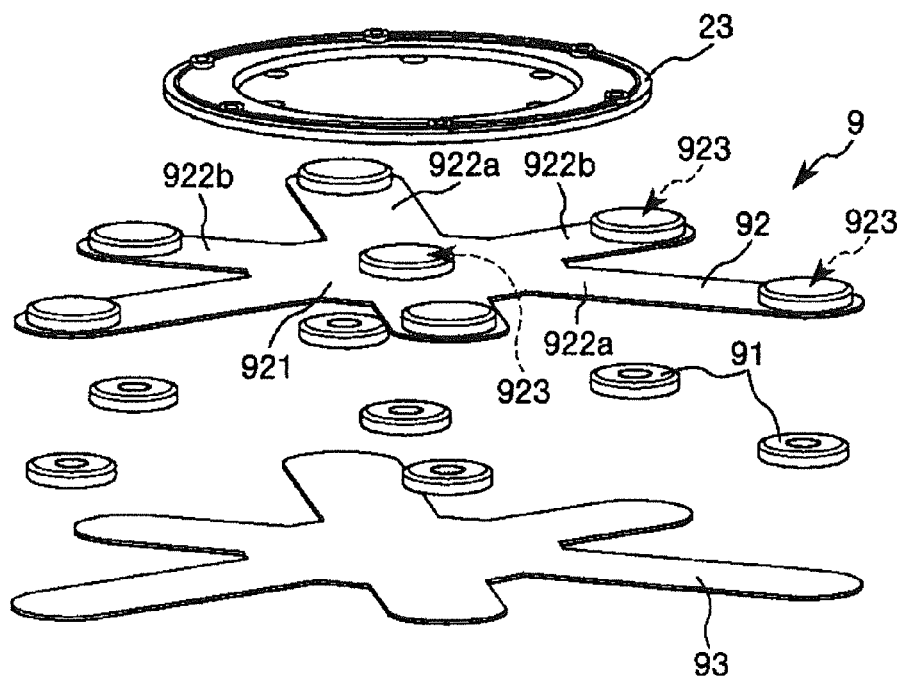
FIG. 6 is an exploded perspective view showing a mounting mechanism of the power generator shown in FIG. 1.
Figure 7:
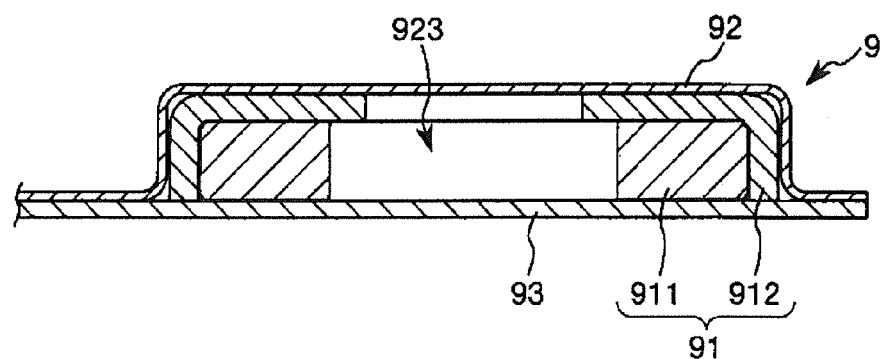
FIG. 7 is a cross-sectional view taken along with a B-B line shown in FIG. 1.
Figure 9A:
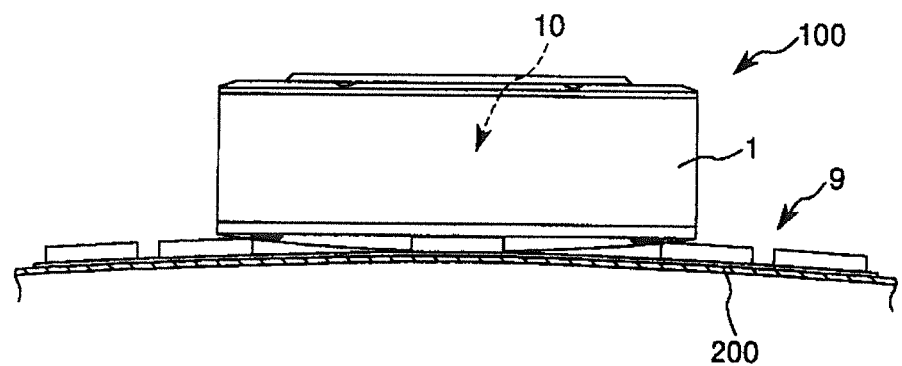
FIGS. 9a and 9b are enlarged side views showing the power generator shown in the FIG. 8 under different operating conditions.
Figure 9B:
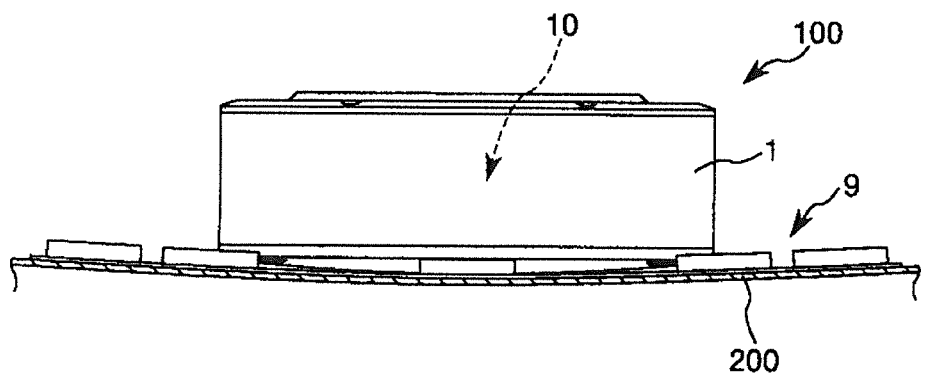
Figure 10A:
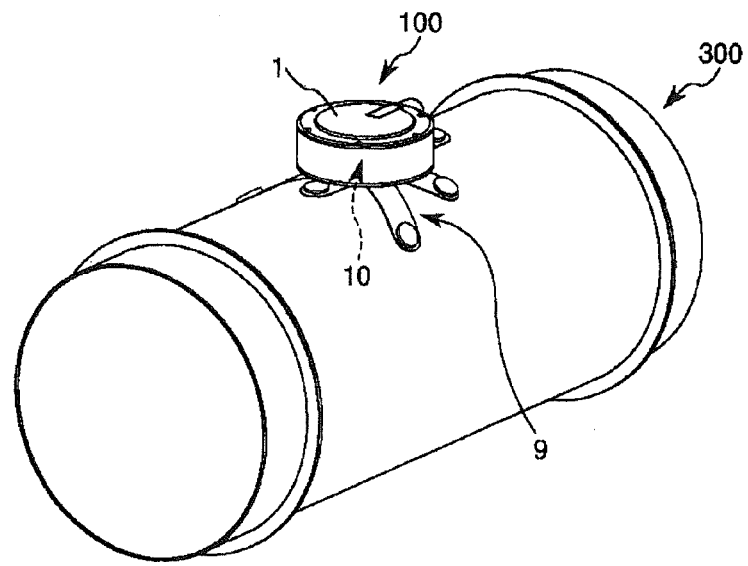
FIG. 10a is a perspective view and FIG. 10b is a cross-sectional view showing the power generator shown in FIG. 1, which shows another state for use (another attached state).
Figure 10B:
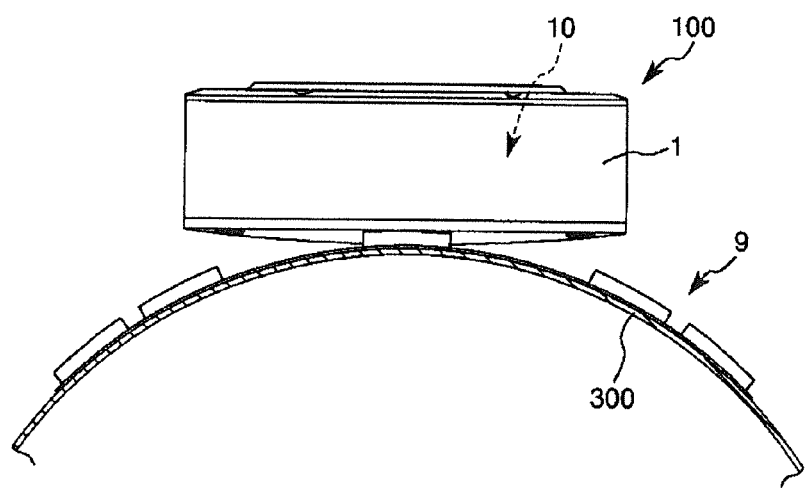

FIG. 1 is a perspective view showing the power generator 100 according to the first embodiment of the present invention. FIG. 2 is a planar view showing the power generator 100 shown in FIG. 1. FIG. 3 is an exploded perspective view showing a main unit of the power generator shown in FIG. 1. FIG. 4 is a cross-sectional view taken along with an A-A line shown in FIG. 1 (a vertical cross-sectional view showing the main unit shown in FIG. 3). FIG. 5 is a planar view showing a leaf spring included in the main unit shown in FIG. 3. FIG. 6 is an exploded perspective view showing a mounting mechanism of the power generator shown in FIG. 1. FIG. 7 is a cross-sectional view taken along with a B-B line shown in FIG. 1. FIG. 8 is a perspective view showing the power generator 100 shown in FIG. 1, which shows a state for use (attached state). FIG. 9 is an enlarged side view showing the power generator 100 shown in the FIG. 8. FIG. 10 is a perspective view showing the power generator 100 shown in FIG. 1, which shows another state for use (another attached state).

Hereinafter, an upper side in each of FIGS. 1, 3, 4 and 6 to 10 is referred to as "upper" or "upper side" and a lower side in each of FIGS. 1, 3, 4 and 6 to 10 is referred to as "lower" or "lower side". A front side of the paper in each of FIGS. 2 and 5 is referred to as "upper" or "upper side" and a rear side of the paper in each of FIGS. 2 and 5 is referred to as "lower" or "lower side".

The power generator 100 shown in FIGS. 1 and 2 is configured to be used in a state that the power generator 100 is fixedly attached to a vibrating body formed of a magnetic material. The power generator 100 includes a main unit 1, an attachment 9 fixedly attaching the main unit 1 to the vibrating body and a connector 11 to be coupled to an external device. The connector 11 is provided at a peripheral surface of the main unit 1 so as to outwardly extend from the main unit 1.

As shown in FIGS. 1 to 3, the main unit 1 includes a housing 20 and a power generating unit 10 disposed in the housing 20 so that the power generating unit 10 can be vibrated in a vertical direction in FIG. 4. The power generating unit 10 has a pair of an upper leaf spring 60U and a lower leaf spring 60L opposed to the upper leaf spring 60U, a magnet assembly 30 supported between the pair of leaf springs 60U, 60L and having a permanent magnet 31, a coil 40 disposed so as to surround the permanent magnet 31 and a coil holding portion 50 holding the coil 40. In this embodiment, the upper leaf spring 60U and the lower leaf spring 60L have a shape substantially identical to each other.

<<Housing 20>>

As shown in FIGS. 3 and 4, the housing 20 has a cover 21, a base (support board) 23 supporting the power generating unit 10 on an upper side (one surface side) of the base 23 and a cylindrical portion 22 disposed between the cover 21 and the base 23.

The cover 21 is formed into a roughly discoid shape which includes a circular portion and an annular lib (a ring-shaped lib) 211 integrally formed around a periphery of the circular portion so as to downwardly protrude from the periphery of the circular portion. Six through-holes 212 are formed in the lib 211 at substantially regular intervals. Further, a concave portion (runoff) 214 is defined by the cover 21 on the inner side of the lib 211 so as to downwardly open. Since the power generating unit 10 can be displaced (retracted) in the concave portion 214 at the time of vibration, it is possible to prevent the power generating unit 10 from contacting with the cover 21 (circular portion).

The cylindrical portion 22 has a cylindrical shape, and an outer diameter thereof in the planer view is substantially equal to an outer diameter of the lib 211 of the cover 21 in the planer view. When the power generating unit 10 is assembled in the housing 20 (hereinafter, this state is referred to as "assembled state"), a main part of the power generating unit 10 which contributes to power generation is disposed in the cylindrical portion 22.

Six boss sections 221 are formed on an inner circumferential surface of the cylindrical portion 22 so as to respectively correspond to the through-holes 212. Upper threaded holes 221a are respectively formed on upper ends of the boss sections 221. In addition, six through-holes 66 are formed in a peripheral portion of each of the upper leaf spring 60U and the lower leaf spring 60L (that is, first circular portions 61 of the leaf springs 60U, 60L which will be explained below) along with a circumferential direction of each of the leaf springs 60U, 60L at substantially regular intervals.

The peripheral portion of the upper leaf spring 60U is disposed between the cover 21 and the cylindrical portion 22, and then screws 213 are respectively screwed into the upper threaded holes 221a of the boss sections 221 passing through the through-holes 212 of the cover 21 and the through-holes 66 of the upper leaf spring 60U. This makes it possible to fixedly hold the peripheral portion of the upper leaf spring 60U between the cover 21 and the cylindrical portion 22.

The base 23 is formed into a roughly discoid shape which includes a circular portion and an annular lib (a ring-shaped lib) 231 integrally formed around a periphery of the circular portion so as to upwardly protrude from the periphery of the circular portion. Six through-holes 232 are formed in the lib 231 at substantially regular intervals. Further, a concave portion (runoff) 234 is defined by the base 23 on the inner side of the lib 231 so as to upwardly open. Since the power generating unit 10 can be displaced (retracted) in the concave portion 234 at the time of vibration, it is possible to prevent the power generating unit 10 from contacting with the base 23.

In addition, four threaded holes (female screws) 221b are respectively formed on lower ends of the boss sections 221. The peripheral portion of the lower leaf spring 60L (that is, the first circular portion 61) is disposed between the base 23 and the cylindrical portion 22, and then screws 233 are respectively screwed into the lower threaded holes 221b of the boss sections 221 passing through the through-holes 232 of the base 23 and the through-holes 66 of the lower leaf spring 60L. This makes it possible to fixedly hold the peripheral portion of the lower leaf spring 60L between the base 23 and the cylindrical portion 22, that is, the power generating unit 10 is coupled with the base 23 and the cylindrical portion 22.

As shown in FIG. 4, a lower surface (other surface) 230 of the base 23 forms a curved convex surface downwardly protruding. An effect provided by such curved convex surface will be explained below. A concave portion 235 is formed in the lower surface 230 of the base 23 so as to receive a permanent magnet 911 constituting a part of the attachment 9 and the like.

A constituent material of the housing 20 (the cover 21, the cylindrical portion 22 and the base 23) is not limited to a specific material, but examples of the constituent material include a metallic material, a ceramic material, a resin material and a combination of two or more of the above materials.

A width of the housing 20 is not limited to a specific value, but preferably in the range of about 60 to 120 mm from the view point of downsizing the power generator 100. An average height of the housing 20 is not limited to a specific value, but preferably in the range of about 20 to 50 mm, and more preferably in the range of about 30 to 40 mm from the viewpoint of reducing the height of the power generator 100.

The power generating unit 10 is supported in the housing 20 through the upper and lower leaf springs 60U, 60L in a state that the power generating unit 10 can be vibrated.

<<Upper Leaf Spring 60U and Lower Leaf Spring 60L>>

The peripheral portion of the upper leaf spring 60U is fixedly held between the cover 21 and the cylindrical portion 22. The peripheral portion of the lower leaf spring 60L is fixedly held between the base 23 and the cylindrical portion 22.

Each of the leaf springs 60U, 60L is a circular component formed of a metallic-thin plate such as an iron plate, a stainless steel plate. As shown in FIG. 5, each of the leaf springs 60U, 60L has the first circular portion 61 having a first inner diameter, a second circular portion 62 having a second inner diameter smaller than the first inner diameter of the first circular portion 61 and a third circular portion 63 having a third inner diameter smaller than the second inner diameter of the second circular portion 62. In each of the leaf springs 60U, 60L, the first circular portion 61, the second circular portion 62 and the third circular portion 63 are arranged from the outside to the inside thereof in this order.

Further, the first circular portion 61, the second circular portion 62 and the third circular portion 63 are arranged concentrically in each of the leaf springs 60U, 60L. The first circular portion 61 is coupled with the second circular portion 62 through a plurality of first spring portions 64 (in this embodiment, the number of the first spring portions 64 is six). The second circular portion 62 is coupled with the third circular portion 63 through a plurality of second spring portions 65 (in this embodiment, the number of the second spring portion 65 is three).

The six through-holes 66 are formed in the first circular portion 61 of each of the leaf springs 60U, 60L along with a circumferential direction of the first circular portion at substantially regular intervals (at regular angular-intervals of about 60 degree). As explained above, the screws 213 are respectively screwed into the upper threaded holes 221a of the boss sections 221 passing through the through-holes 66 of the upper leaf spring 60U. On the other hand, the screws 233 are respectively screwed into the lower threaded holes 221b of the boss sections 221 passing through the through-holes 66 of the lower leaf spring 60L.

Further, six through-holes 67 are formed in the second circular portion 62 of each of the leaf springs 60U, 60L along with a circumferential direction of the second circular portion 62 at substantially regular intervals (at regular angular-intervals of about 60 degree). Furthermore, the coil holding portion 50 (which will be explained below) has six boss sections 511 formed along with a circumferential direction of the coil holding portion 50 so as to extend in the vertical direction. Upper threaded holes 511a are respectively formed on upper ends of the boss sections 511. Lower threaded holes 511b are respectively formed on lower ends of the boss sections 511.

Screws 82 are respectively screwed into the upper threaded holes 511a of the boss sections 511 passing through the through-holes 67 of the upper leaf spring 60U. This makes it possible to couple the second circular portion 62 of the upper leaf spring 60U with the coil holding portion 50. In the same manner, the other screws 82 are respectively screwed into the lower threaded holes 511b of the boss sections 511 passing through the through-holes 67 of the lower leaf spring 60L. This makes it possible to couple the second circular portion 62 of the lower leaf spring 60L with the coil holding portion 50.

A spacer 70 disposed above the magnet assembly 30 is coupled with the third circular portion 63 of the upper leaf spring 60U. On the other hand, the magnet assembly 30 is coupled with the third circular portion 63 of the lower leaf spring 60L. In this embodiment, the spacer 70 is coupled with the magnet assembly 30 by a screw 73.

Each of the six first spring portions 64 in the leaf springs 60U, 60L has an arch-shaped portion (a substantially sigmoidal shape). Each of the first spring portions 64 is arranged in a space between the first circular portion 61 and the second circular portion 62 so as to constitute three pairs. The two first spring portions 64 constituting one of the three pairs are arranged so as to be opposed to each other through the second circular portion 62 (the coil holding portion 50). The three pairs of the first spring portions 64 are arranged so as to be rotationally symmetric with each other around a central axis of the third circular portion 63. Each of the first spring portions 64 has one end coupled with the first circular portion 61 in the vicinity of the through-hole 66 of the first circular portion 61, the arch-shaped portion extending along with an inner periphery of the first circular portion 61 and an outer periphery of the second circular portion 62 in the counterclockwise direction, and another end coupled with the second circular portion 62 in the vicinity of the through-hole 67.

The six first spring portions 64 in each of the leaf springs 60U, 60L couple the second circular portion 62 with the first circular portion 61 in a state that the second circular portion 62 can be vibrated relative to the first circular portion 61 in the vertical direction in FIG. 4. As mentioned above, each of the first circular portions 61 is fixedly held by the housing 20. Further, each of the second circular portions 62 is coupled with the coil holding portion 50. Therefore, when the external vibration of the vibrating body is transmitted to the housing 20, the vibration is transmitted to the second circular portion 62 through the first spring portions 64. As a result, the coil holding portion 50 can be vibrated relative to the housing 20 in the vertical direction.

Each of the three second spring portions 65 in each of the leaf springs 60U, 60L has an arch-shaped portion (a substantially sigmoidal shape). In more detail, each of the second spring portions 65 is arranged in a space between the second circular portion 62 and the third circular portion 63 so as to be rotationally symmetric around the central axis of the third circular portion 63 with each other. Each of the second spring portions 65 has one end coupled with the second circular portion 62 in the vicinity of the through-hole 67, the arch-shaped portion extending along with an inner periphery of the second circular portion 62 and an outer periphery of the third circular portion 63 in the clockwise direction, and another end coupled with the third circular portion 63.

The three second spring portions 65 in each of the leaf springs 60U, 60L couple the third circular portion 63 with the second circular portion 62 in a state that the third circular portion 63 can be vibrated relative to the second circular portion 62 in the vertical direction in FIG. 4. As mentioned above, each of the second circular portions 62 is coupled with the coil holding portion 50. Further, each of the third circular portions 63 of the leaf springs 60U, 60L is directly or indirectly coupled with the magnet assembly 30. Therefore, the vibration which is transmitted from the vibrating body to the second circular portion 62 is transmitted to the third circular portion 63 through the second spring portions 65. As a result, the magnet assembly 30 can be vibrated relative to the coil holding portion 50 in the vertical direction.

As shown in FIG. 5, each of the leaf springs 60U, 60L explained above has a rotationally symmetrical shape around a central axis thereof (the central axis of the third circular portion 63). This makes it possible to prevent variation in spring constants of the first spring portions 64 and the second spring portions 65 arranged along with the circumferential direction. As a result, it is possible to enhance a lateral stiffness of each of the leaf springs 60U, 60L (stiffness along with a direction orthogonal to the thickness direction of each of the leaf springs 60U, 60L) as a whole. In addition, it is possible to make an assembly work of the power generator 100 (the main unit 1) easier.

The power generator 100 having the above structure includes a first vibrating system in which the coil holding portion 50 coupled with the housing 20 through the first spring portions 64 of the leaf springs 60U, 60L is vibrated relative to the housing 20 and a second vibrating system in which the magnet assembly 30 coupled with the coil holding portion 50 through the second spring portions 65 of the leaf springs 60U, 60L is vibrated relative to the coil holding portion 50. In other words, in the power generator 100, the power generating unit 10 includes a two degrees of freedom vibrating system having the first vibrating system and the second vibrating system.

In the power generating unit 10 having such two degrees of freedom vibrating system, the first vibrating system has a first natural frequency $\omega_1$ determined by a mass $m_1$ of the coil holding portion 50 holding the coil 40 (hereinafter, the coil holding portion 50 holding the coil 40 is sometimes referred to as the coil holding portion 50 simply), a mass ratio $\mu$ between the coil holding portion 50 and the magnet assembly 30 and a spring constant $k_1$ of the first spring portions 64. On the other hand, the second vibrating system has a second natural frequency $\omega_2$ determined by a mass $m_2$ of the magnet assembly 30, the mass ratio $\mu$ between the coil holding portion 50 and the magnet assembly 30 and a spring constant $k_2$ of the second spring portions 65. The natural frequencies $\omega_1$ and $\omega_2$ can be expressed by the following motion equation (1) according to the model diagram for the two degrees of freedom vibrating system shown in FIG. 5.

[Motion equation (1)]

$$\begin{bmatrix} \omega_1 \\ \omega_2 \end{bmatrix} = \frac{1}{2}\{\Omega_1^2 + (1+\mu)\Omega_2^2\} \mp \sqrt{\{\Omega_1^2 + (1+\mu)\Omega_2^2\}^2 - 4\Omega_1^2\Omega_2^2} \quad (1)$$

wherein "$\mu$" is defined by $\frac{m_2}{m_1}$,

"$\Omega_1$" is defined by $\sqrt{\frac{k_1}{m_1}}$ and "$\Omega_2$" is difened by $\sqrt{\frac{k_2}{m_2}}$ Namely, each of the natural frequencies $\omega_1$ and $\omega_2$ is determined by the above three parameters of "$\mu$", "$\Omega_1$" and "$\Omega_2$".

The amount of electric power generated by the two degrees of freedom vibrating system (power generating capacity of the two degrees of freedom vibrating system) represented by the motion equation (1) decays due to power generation. The amount of the generated electric power maximizes at two resonant frequencies $f_1$ and $f_2$ respectively determined by the two natural frequencies $\omega_1$ and $\omega_2$. Namely, in the power generator 100, the power generating unit 10 can be efficiently vibrated relative to the housing 20 in a broad frequency range between the two resonant frequencies $f_1$ and $f_2$. In a case where the two degrees of freedom vibrating system has no decay, the natural frequencies $\omega_1$ and $\omega_r$ are respectively equal to the resonant frequencies $f_1$ and $f_2$.

By setting the masses ($m_1$ and $m_2$) and the spring constants ($k_1$ and $k_2$) of the vibrating systems so that the first resonant frequency $f_1$ is different from the second resonant frequency $f_2$, that is, reduplication of the resonant frequency is achieved, the generating unit 10 can be efficiently vibrated by the external vibration (that is, vibration applied to the housing 20) having a frequency other than the set resonant frequencies $f_1$ and $f_2$.

For example, in a case where the frequency of the vibrating body is in the range of 20 to 40 Hz, it is preferred that the masses ($m_1$ and $m_2$) and the spring constants ($k_1$ and $k_2$) of the vibrating system are adjusted so as to satisfy the following conditions represented by the following conditional equations (1A) to (3A). This makes it possible to especially improve power generation efficiency of the power generator 100 with the external vibration of the vibrating body having the above frequency.

$$m_1[kg]:m_2[kg]=1.5:1 \quad (1A)$$

$$m_1[kg]:k_1[N/m]=1:60000 \quad (2A)$$

$$m_2[kg]:k_2[N/m]=1:22000 \quad (3A)$$

In order to set the spring constants ($k_1$ and $k_2$) of the spring portions (the first spring portions 64 and the second spring portions 65) at desired values, an average thickness of each of the leaf spring 60U, 60L may be appropriately adjusted. In this time, the average thickness of each of the leaf springs 60U, 60L is preferably in the range of about 0.1 to 0.4 mm, and more preferably in the range of about 0.2 to 0.3 mm. By setting the average thickness of each of the leaf springs 60U, 60L to be within the above range, it is possible to reliably prevent plastic deformations, fractures and the like of the leaf springs 60U, 60L. This makes it possible to use the power generator 100 over a long time in a state that the power generator 100 is fixedly attached to the vibrating body.

<<Magnet Assembly 30>>

The magnet assembly 30 having the permanent magnet 31 is supported between the upper leaf spring 60U and the lower leaf spring 60L.

The magnet assembly 30 includes the permanent magnet 31 having a cylindrical shape, a back yoke 32 formed by a bottom plate 321 having a central portion on which the permanent magnet 31 is provided and a periphery, a cylindrical portion 322 upwardly extending from the periphery of the bottom plate 321 and a circular yoke 33 disposed on the upper side of the permanent magnet 31. The magnet assembly 30 is supported between the leaf springs 60U, 60L in a state that the periphery of the bottom plate 321 is coupled with the third circular portion 63 of the lower leaf spring 60L and the yoke 33 is coupled with the third circular portion 63 of the upper leaf spring 60U through the spacer 70.

The permanent magnet 31 is disposed between the back yoke 32 and the yoke 33 in a state that a north pole of the permanent magnet 31 faces to the yoke 33 and a south pole of the permanent magnet 31 faces to the bottom plate 321 of the back yoke 32. Namely, the magnet assembly 30 is supported between the leaf springs 60U, 60L in a state that the magnet assembly 30 can be displaced in a magnetization direction.

Examples of the permanent magnet 31 include an alnico magnet, a ferrite magnet, a neodymium magnet, a samarium-cobalt magnet, a bonded magnet obtained by molding a compound material constituted of pulverized materials of the above magnets which are mixed with a resin material or a rubber material. The permanent magnet 31 is fixedly supported between the back yoke 32 and the yoke 33, for example, by an own magnetic force (attraction force) or an adhesive agent.

The yoke 33 has a size in the planer view substantially equal to a size of the permanent magnet 31 in the planar view. The yoke 33 has a threaded hole 331 formed in a central portion thereof.

The back yoke 32 has the bottom plate 321 and the cylindrical portion 322 upwardly extending from the periphery of the bottom plate 321. The permanent magnet 31 is disposed on the central portion of the bottom plate 321 concentrically with the cylindrical portion 332. The threaded hole 331 is formed in the central portion of the permanent magnet 31. The magnet assembly 30 having such back yoke 32 can increase a magnetic flux generated from the permanent magnet 31.

Examples of constituent materials for the back yoke 32 and the yoke 33 include a pure iron (for example, JIS SUY), a soft iron, a carbon iron, a magnetic steel (a silicon steel), a high-speed tool steel, a structural steel (for example, JI SS400), a stainless, a permalloy and a combination of two or more of the above materials.

<<Coil Holding Portion 50>>

The coil holding portion 50 is disposed between the magnet assembly 30 and the housing 20. The coil holding portion 50 includes a main body 51 and a ring-shaped member 52 having an opening formed in a central portion of the ring-shaped member 52. The main body 51 has a cylindrical shape having a peripheral portion.

As shown in FIG. 4, the cylindrical shape of the main body 51 resembles a shape formed by lightening a peripheral portion of a cylindrical block. The six boss sections 511 are formed in the peripheral portion of the main body 51 along with a circumferential direction of the main body 51 so as to extend in the vertical direction. The upper threaded holes 511a are respectively formed on the upper ends of the boss sections 511. The lower threaded holes 511b are respectively formed on the lower ends of the boss sections 511.

The ring-shaped member 52 is integrally formed with the main body 51. The ring-shaped member 52 has an inner diameter larger than an outer diameter of the spacer 70 (the main body 71). The coil 40 is supported on the lower surface of the ring-shaped member 52 of the coil holding portion 50 and positioned close to an inner periphery of the opening of ring-shaped member 52.

<<Coil 40>>

The coil 40 has an outer diameter smaller than that of the cylindrical portion 322 of the back yoke 32 and an inner diameter larger than those of the permanent magnet 31 and the yoke 33. This makes it possible to dispose the coil 40 between the cylindrical portion 322 of the back yoke 32 and the permanent magnet 31 of the magnet assembly 30 without contacting with the cylindrical portion 322 and the permanent magnet 31 in the assembled state.

The coil 40 can be displaced relative to the permanent magnet 31 in the vertical direction due to the vibration of the power generating unit 10. In this time, a magnetic flux density passing through the coil 40 caused by the permanent magnet 31 changes, and thus electric voltage is generated in the coil 40.

The coil 40 is formed by winding a wire rod. The wire rod is not limited to a specific type, but examples of the wire rod include a wire rod obtained by covering a copper base line with an insulating film, a wire rod obtained by covering a copper base line with an insulating film having adhesiveness and a combination thereof. The number of turns in the coil 40 is not limited to a specific number and may be appropriately set according to a cross-sectional area of the wire rod and the like. A cross-sectional shape of the wire rod may be any shape such as a polygonal shape including a triangular shape, a square shape, a rectangle shape and a hexagonal shape, a circular shape and an elliptical shape.

Both ends of the wire rod forming the coil 40 are connected with the connector 11 through an electric voltage output unit (not shown) disposed above the ring-shaped member 52 of the coil holding portion 50. This makes it possible to output the electric voltage generated in the coil from the connector 11. The magnet assembly 30 is coupled with the upper leaf spring 60U through the spacer 70.

<<<Spacer 70>>>

The spacer 70 has a main body 71 having a cylindrical shape with a sealed end and a non-sealed end and a circular flange 72 integrally formed along with an outer periphery of the non-sealed end. The sealed end of the spacer 70 is coupled with the magnet assembly 30 (the yoke 33) by the screw 73. An outer side of an upper surface of the flange 72 is coupled with the third circular portion 63 of the upper leaf spring 60U.

Examples of a constituent material for the spacer 70 include magnesium, aluminum and a resin material for molding.

As shown in FIG. 4, in the power generator 100 having such structure, when the external vibration of the vibrating body is transmitted to the housing 20, the power generating unit 10 is vibrated in the housing 20 in the vertical direction. In more detail, the coil holding portion 50 coupled with the housing 20 through the first spring portions 64 of the leaf springs 60U, 60L is vibrated relative to the housing 20 (namely, the first vibrating system is vibrated). In the same manner, the magnet assembly 30 coupled with the coil holding portion 50 through the second spring portions 65 of the leaf springs 60U, 60L is vibrated relative to the coil holding portion 50 holding the coil 40 (namely, the second vibrating system is vibrated).

Each of the leaf springs 60U, 60L has a lateral spring constant in a lateral direction perpendicular to the vibrating direction of the spring portions 64, 65 (the vertical direction). The lateral spring constant is structurally larger than the spring constant in the vibrating direction of the spring portions 64, 65. Namely, each of the leaf springs 60U, 60L has a longitudinal stiffness in a thickness direction thereof and a lateral stiffness in the lateral direction larger than the longitudinal stiffness. Thus, each of the leaf springs 60U, 60L is more likely to be distorted or deformed in the thickness direction than the lateral direction. Further, both ends in the thickness direction of each of the magnet assembly 30 and the coil holding portion 50 are coupled with the leaf springs 60U, 60L. Thus, the magnet assembly 30 and the coil holding portion 50 can be vibrated together with the leaf springs 60U, 60L.

For the reasons explained above, it is possible to prevent the magnet assembly 30 and the coil holding portion 50 from being vibrated in the lateral direction perpendicular to the thickness direction of the leaf springs 60U, 60L (lateral motion) and being rotated (rolling motion). This makes it possible to restrict a vibrational axis of the magnet assembly 30 and the coil holding portion 50 to a specific direction (the vertical direction). Further, as explained above, the coil 40 is disposed so as not to contact with the magnet assembly 30 (the permanent magnet 31, the yoke 33 and the back yoke 32).

As a result, it is possible to prevent the magnet assembly 30 and the coil holding portion 50 from contacting with each other while the power generating unit 10 is vibrated (that is, at the time of generating electric power). In particular, since both the magnet assembly 30 and the coil holding portion 50 have high stiffness, both the magnet assembly 30 and the coil holding portion 50 also have a high lateral stiffness in the lateral direction perpendicular to the vibrating direction as well as the leaf springs 60U, 60L. Thus, it is possible to reliably prevent the magnet assembly 30 and the coil holding portion 50 from contacting with each other.

As explained above, in the power generator 100, since the contact between the magnet assembly 30 and the coil holding portion 50 is avoided, it is possible to efficiently transmit vibrational energy of the vibrating body to the first vibrating system and then efficiently transmit vibrational energy of the first vibrating system to the second vibrating system. As a result, a relative displacement between the magnet assembly 30 and the coil 40 is reliably performed. As shown in FIG. 4, a magnetic loop (magnetic circuit) generated by the permanent magnet 31, the yoke 33 and the back yoke 32 flows from a center to a periphery of the magnet assembly 30 through the yoke 33 and flows from the periphery to the center of the magnet assembly 30 through the back yoke 32.

In such structure, a magnetic field having a magnetic flux density B (the magnetic loop) generated from the permanent magnet 31 is changed in the coil 40 due to the relative displacement between the magnet assembly 30 and the coil 40. This change of such magnetic flux density B induces an electromotive force in the coil 40 due to Lorentz force acting on electrons in the coil 40 through which the magnetic field passes. The electromotive force directly contributes to the power generation of the power generating unit 10. Thus, the power generating unit 10 can efficiently generate electric power.

In the power generating unit 10, a clearance between the first spring portions 64 of the upper leaf spring 60U and the first spring portions 64 of the lower leaf spring 60L may be set so that a clearance at one side close to the cylindrical portion 22 of the housing 20 is substantially equal to or different from a clearance at another side close to the coil holding portion 50. In the same manner, a clearance between the second spring portions 65 of the upper leaf spring 60U and the second spring portions 65 of the lower leaf spring 60L may be set so that a clearance at one side close to the coil holding portion is substantially equal to or different from a clearance at another side close to the magnet assembly 30 (the spacer 70).

In a case where the clearances are set so as to vary from the one side to the other side, it is possible to add pre-tensions in the vertical direction to the first spring portions 64 and/or the second spring portions 65. In such structure, postural changes of the power generating unit 10 caused at the time of horizontally (situation shown in FIG. 8a) or vertically (situation shown in FIG. 8b) mounting the power generator 100 on the vibrating body are suppressed. Therefore, the power generator 100 can reliably provide high power generation efficiency regardless of the postural of the power generator 100 (regardless of installation locations for the power generator 100).

The attachment 9 is provided on a lower surface (the other surface opposite to the one surface on which the power generating unit 10 is disposed) of the base (the support board) 23 of the main unit 1. By attaching the attachment 9 to the vibrating body formed of the magnetic material, it is possible to fixedly attach the main unit 1 (the power generator 100) to the vibrating body.

<<<Attachment 9>>>

As shown in FIGS. 6 and 7, the attachment 9 has a plurality of magnet assemblies 91 (in this embodiment, the number of the assemblies 91 is seven), a first sheet member 92 for holding the magnet assemblies 91 and a second sheet member 93 provided on one side of the magnet assemblies 91 opposed to another side of the magnet assemblies 91 on which the main unit 1 is provided.

Each of the magnet assemblies 91 has a small permanent magnet (magnet block) 911 having a circular shape, a cylindrical yoke 912 having a bottom plate (an upper plate), a through-hole formed in the bottom plate and a peripheral portion upwardly extending from the bottom plate. Each of the permanent magnets 911 is attached to an inner side of the yoke 912 defined by the bottom plate and the peripheral portion by a magnetic force (attraction force) of each of the permanent magnets 911 or an adhesive agent. The magnet assembly 91 having the yoke 912 with such structure can increase the attraction force of the permanent magnet 911.

The permanent magnet 911 is not particularly limited, as long as the permanent magnet 911 can provide an enough attraction force. The permanent magnet 911 may be identical to the permanent magnet 31 explained above. By using such permanent magnet 911, it is possible to fixedly attach the power generator 100 to the vibrating body with the enough attraction force (fixed power) regardless of the constituent material of the vibrating body. Further, it is possible to make a process for removing the power generator 100 from the vibrating body easy. Namely, it is possible to easily remove the power generator 100 from the vibrating body without any difficulties.

As a constituent material of the yoke 912, a soft magnetic material having a high saturated magnetic flux is preferably used. In a case of forming the yoke 912 by a press molding, a plate material obtained by plating a base material formed of an iron-based material is preferably used for the yoke 912. Examples of the plate material includes a zinc plating steel plate, a tin plating steel plate and a nickel plating steel plate.

The magnet assemblies 91 are mounted to the lower surface 230 of the base 23 through the first sheet member (mounting mechanism) 92. As shown in FIG. 6, the first sheet member 92 has a fixed portion 921 fixed to the lower surface 230 of the base 23 and having a substantially circular shape and a plurality of arm portions 922 integrally formed with the fixed portion 921 so as to outwardly extend from the fixed portion 921. Each of the arm portions 922 has one end portion integrally formed with the fixed portion 921 and another end portion opposite to the one end portion so as to outwardly extend from the fixed portion 921. The fixed portion 921 is fixed to the base 23 by an adhesive agent or the like.

Concave portions (magnet holding portions) 923 for holding the magnet assemblies 91 are formed on a central portion of the fixed portion 921 and the other end portion of each of the arm portions 922. Each of the magnet assemblies 91 is held in the concave portions 923 and fixed to the fixed portion 921 or the arm portions 922 by, for example, an adhesive agent. In the assembled state, the magnet assembly 91 held in the concave portion 923 formed on the fixed portion 921 is received (located) in the concave portion 235 of the base 23.

The first sheet member 92 has flexibility. This allows to displace the magnet assemblies 91 (permanent magnets 911) respectively held in the concave portions 923 formed on the arm portions 922 in the thickness direction of the base 23. As shown in FIG. 2, each of the arm portions 922 has a length allowing the concave portions 923 (magnet assemblies 91) to locate outside of the main unit 1 in a planer view when the power generator 100 is attached to a planation surface.

This makes it possible to reduce stiffnesses of each of the arm portions 922 in a direction where the arm portions 922 come closer to each other and in a torsional direction around a longitudinal direction of each of the arm portions 922 without reducing a stiffness of each of the arm portions 922 in the longitudinal direction of each of the arm portions 922. As a result, even in a case where the power generator 100 is fixedly attached to a vibrating body having a curved surface (curved portion) such as a pipe 300 shown in FIG. 10, it is possible to stably and fixedly attach the main unit 1 to the vibrating body.

The arm portions 922 are arranged along with an circumferential direction of the fixed portion 921 at substantially regular intervals (at regular angular-intervals of about 60 degree). Namely, three of the permanent magnets 911 are arranged so as to be rotationally symmetric with each other. This makes it possible to fixedly attach the main unit 1 to the vibrating body by attraction forces arranged along with the circumferential direction thereof. Thus, it is possible to prevent the power generator 100 from sliding (moving) to a specific direction. Namely, it is possible to keep the power generator 100 in an attached position on the vibrating body even in a case where the vibrating body is vibrated.

In particular, the arm portions 922 in this embodiment include a plurality of first arm portions 922a respectively having a first length and a plurality of second arm portions 922b respectively having a second length shorter than the first length of the first arm portion 922a. The arm portions 922 are configured to locate each of the second arm portions 922b between the first arm portions 922a. This makes it possible to enhance fixing strength (holding strength) of the main unit 1 relative to a vibrating body having a curved surface with a relatively small radius of curvature by using the second arm portions 922b and enhance fixing strength (holding strength) of the main unit 1 relative to a vibrating body having a curved surface with a relatively large radius of curvature by using the first arm portions 922a. Namely, by using the arm portions 922 having such structure, it is possible to stably and fixedly attach the main unit 1 (power generator 100) to the vibrating body regardless of the shape and the size of the vibrating body.

A length from the central portion of the fixed portion 921 to the other end portion of each of the first arm portions 922a is not particularly limited to a specific value, but preferably in the range of about 1.8 to 4 times a radius of the base 23, and more preferably in the range of about 2 to 3.5 times the radius of the base 23. In the same manner, a length from the central portion of the fixed portion 921 to the other end portion of each of the second arm portions 922b is not particularly limited to a specific value, but preferably in the range of about 1.2 to 2.5 times the radius of the base 23, and more preferably in the range of about 1.2 to 2 times the radius of the base 23.

As the first sheet member 92, a sheet member having high flexibility (softness), bendability and tensile strength is preferably used. Examples of the first sheet member 92 include a film such as a polyester film, a polyethylene film, a polypropylene film and a polyvinyl chloride film; and a woven fabric obtained by weaving a polymeric fiber.

An average thickness of the first sheet member 92 is not particularly limited to a specific value, but preferably in the range of about 0.01 to 1.0 mm, and more preferably in the range of about 0.03 to 0.1 mm. Since the first sheet member 92 having the above average thickness has superior flexibility and bendability regardless of the constituent material of the first sheet member 92, it is possible to prevent the first sheet member 92 from interfering the vibration of the vibrating body when the vibrating body is vibrated. As a result, it is possible to prevent or suppress efficiency reduction of the power generation of the power generator 100.

The second sheet member 93 having a shape substantially identical to that of the first sheet member 93 is bonded (laminated) to a lower surface of the first sheet member 92. Examples of a method for bonding the second sheet member 93 to the first sheet member 92 include a fusion bonding (a thermal fusion bonding, an ultrasonic fusion bonding or a high frequency fusion bonding) and an adhesion using an adhesive agent.

The second sheet member 93 has a function of preventing slide of the main unit 1 relative to the vibrating body when the main unit 1 is fixedly attached to the vibrating body. Since the attachment 9 has the second sheet member 93, it is possible to reliably prevent the main unit 1 from sliding relative to the vibrating body even in a case where the vibrating body is strongly vibrated.

As the second sheet member 93, a sheet member having a high frictional coefficient and flexibility enough for deforming according to a plurality of micro concavities and convexities on the vibrating body is preferably used. For example, an elastomer material (rubber material) having hardness measured by a general measuring instrument in the range of about 10 to 100 is preferably used as a constituent material for the second sheet member 93. Such elastomer material is not particularly limited to a specific material, but examples of such elastomer material include a butyl rubber, a styrene-butadiene rubber, a nitrile rubber, an acrylic rubber, a silicon rubber, a fluorine-containing rubber, an urethane rubber an a combination of two or more of the above materials.

Among these materials, an elastomer material having a low hardness is preferably used. The second sheet member 93 formed of such elastomer material can provide high adherence property. Further, by using such elastomer material for the second sheet member 93, it is possible to set the frictional coefficient of the second sheet member 93 preferably equal to or more than 0.7, and more preferably equal to or more than 0.8.

An average thickness of the second sheet member 93 is not particularly limited to a specific value, but preferably in the range of about 0.1 to 2.0 mm, and more preferably in the range of 0.3 to 1.0 mm. Since the second sheet member 93 having the above average thickness has superior flexibility and bendability regardless of the constituent material of the second sheet member 93, it is possible to prevent or suppress degradations of the flexibility and the bendability of the first sheet member 92 when the second sheet member 93 is bonded (laminated) to the first sheet member 92.

The power generator 100 having such structure explained above is used in a state that the power generator 100 is fixedly attached to a vibrating body formed of a magnetic material. Examples of such vibrating body include a duct 200 shown in FIG. 8 and a pipe 300 shown in FIG. 10.

The duct 200 shown in FIG. 8 has a square tube shape formed by four deformable plates 201. The duct 200 is formed by, for example, bending and welding a plate material formed of a magnetic material (examples of the plate material include a steel plate and a plated steel plate). Such duct 200 is used for forming a flow channel in a device for delivering (emitting, ventilating, inspiring or circulating) gas such as steam and air.

For example, the duct 200 for air-conditioning which is installed in a facility such as a big center, building and station has a function of an air-channel in which air flows for air-circulation by an air-blower. At a time of passing the air in the duct 200 due to the air-blower, an air-turbulence is caused due to variation (pulsing motion) of air-pressure by the air-blower and/or a movement of the air (fluid) in the duct 200. Such air-turbulence vibrates the duct 200. Further, positive pressure or negative pressure is added to an inner side of the duct 200 by the action of the air-blower. By such pressures in addition to the vibration of the duct 200 due to the air-turbulence, the plates 201 are deformed. In particular, in a case where the positive pressure is added to the inner side of the duct 200, the plates 201 are deformed so as to extend toward the outside of the duct 200 (so as to form a convex surface) as shown in FIG. 9a. On the other hand, in a case where the negative pressure is added to the inner side of the duct 200, the plates 201 are deformed so as to extend toward the inner side of the duct 200 (so as to form a concave surface) as shown in FIG. 9b. By such deformations of the plates 201, the vibration of the duct 200 is amplified.

In this embodiment, the magnet assemblies 91 are mounted to the main unit 1 through the first sheet member 92 having the flexibility. Thus, even in a case where a plurality of concavities and convexities are formed on the plate 201 (a surface to which the power generator 100 is fixedly attached), the first sheet member 92 can absorb the concavities and the convexities because the first sheet member 92 has the flexibility enough for deforming according to the concavities and the convexities of the plate 201. Therefore, it is possible to reliably and fixedly attach the attachment 9 to the plate 201 regardless of a surface profile of the plate 201. In addition, as explained above, even in the case where the plate 201 is deformed so as to form the convex surface (see FIG. 9a) or the concave surface (see FIG. 9b), the first sheet member 92 can be deformed according to the deformation of the plate 201. As a result, an attached state between the attachment 9 and the plate 201 is kept, thereby it is possible to reliably prevent the power generator 100 from undesirably removing from the duct 200.

In this embodiment, the lower surface 230 of the base is a curved convex surface having the convex portion 235 in the center of the lower surface 230. Thus, even in a case where the plate 201 is deformed so as to form the concave surface as shown in FIG. 9b, a periphery of the base 23 is unlikely to contact with the plate 201. From such viewpoint in addition to the above reason, it is possible to reliably prevent the power generator 100 from undesirably removing from the duct 200.

Normally, the vibration of the duct 200 is unwanted vibration because the vibration of the duct 200 results in noise and uncomfortable vibration in the facility. In the present invention, it is possible to generate electric power by utilizing such unwanted vibration of the duct 200 because the main unit 1 is fixedly attached to the duct 200 by attaching the attachment 9 to the plate 201. Therefore, in the facility where the duct 200 is installed, it is possible to obtain the electric power from the power generator 100 without an external power-supply.

For example, by combining the power generator 100 with a sensor and a wireless device, it is possible to obtain a power generating system. In the power generating system, the power generator 100 acts as an electric power supply. By utilizing the electric power generated by the power generator 100, the sensor can get measured data such as illumination intensity, temperature, pressure, noise and the like in the facility or the duct 200 and then transmit the measured data to an external device through the wireless device. The external device can use the measured data as various control signals or a monitoring signal.

Figure 8A:
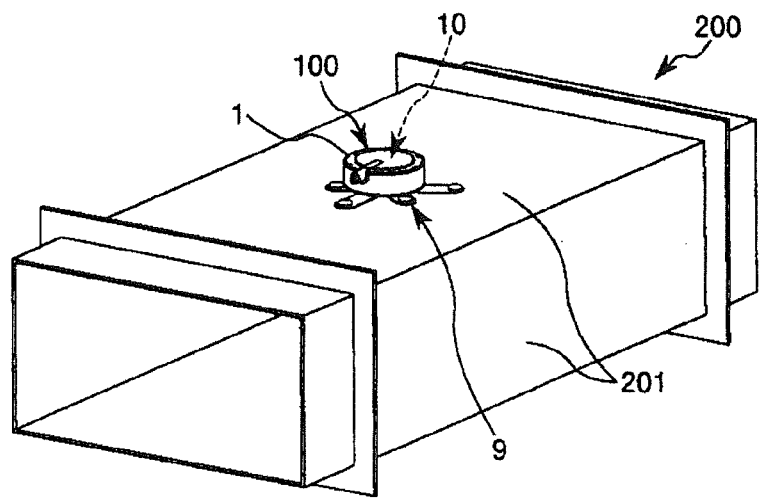
FIGS. 8a and 8b are perspective views showing the power generator shown in FIG. 1, in different positions of use (attached state).
Figure 8B:
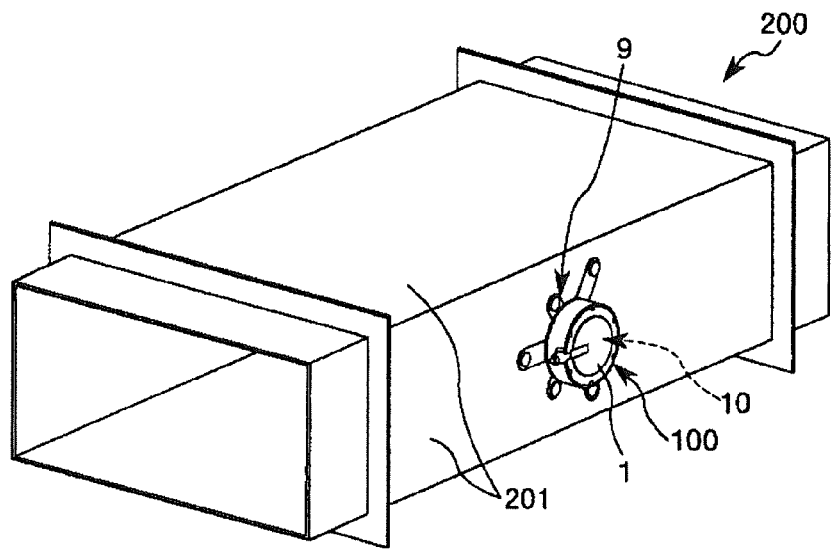

As shown in FIG. 8a, the power generator 100 may be fixedly attached to the plate 201 used as an upper wall of the duct 200. Further, as shown in FIG. 8b, the power generator 100 may be fixedly attached to one of the plates 201 used as side walls of the duct 200.

If a weight of the power generator 100 is too larger relative to a mass and a spring constant of the plate 201, the vibration of the plate 201 is suppressed by the power generator 100. As a result, the vibration of the plate 201 becomes insufficient and thus there is a case where it is impossible to obtain a desired amount of electric power generation. For this reason, in a case where the power generator 100 is used for the duct 200 for air-conditioning, the weight of the power generator 100 is preferably set within the range of 200 to 800 g, and more preferably set within the range of 400 to 600 g.

In a case where the weight of the power generator 100 is 400 g, an attraction force between the attachment 9 and the plate 201 (a summation of attraction forces between each of the magnet assemblies 91 and the plate 201) is preferably set larger than the weight of the power generator 100. In particular, the attraction force between the attachment 9 and the plate 201 (when the attraction force is converted into a weight) is preferably set equal to or more than 600 g. This makes it possible to stably and fixedly attach the power generator 100 to any positions on the plate 201 used as the upper wall of the duct 200.

In addition to a gravitational acceleration 1 G, in light of a vibrational acceleration of the power generator 100 (assuming that the vibrational acceleration is 1 G) and an external vibration (assuming that a vibrational acceleration of the external vibration is 1 G) caused by, for example, an earthquake, an acceleration of 3 G is added to the power generator 100 in total. Thus, if the weight of the power generator 100 is 400 g, the attraction force between the attachment 9 and the plate 201 is preferably set equal to or more than 1200 g. By setting the attraction force between the attachment 9 and the plate 201 equal to or more than 1200 g, it is possible to stably and fixedly attach the power generator 100 to one of the plate 201 used as the side walls of the duct 200. Further, if the attraction force between the attachment 9 and the plate 201 is set about 1200 g, an operator can easily perform the process for removing the power generator 100 from the duct 200.

It is possible to adjust the attraction force between the attachment 9 and the plate 201 by appropriately selecting the type (the constituent material) and/or the number of the permanent magnets 911, the constituent material of the yoke 912 and/or the like.

On the other hand, the pipe 300 shown in FIG. 10 is obtained by bending a plate material (a steel plate or a plated steel plate) into a cylindrical shape and then bonding (welding) a seam of the plate material formed into the cylindrical shape. Namely, the pipe 300 has a curved portion (curved surface) forming a circumferential portion of the pipe 300. Such pipe 300 is used as a flow channel in a device for delivering fuel (fluid) such as hydrogen fuel gas and fuel oil.

For example, the pipe 300 for a fuel-supply system which is installed in facility such as a big plant has a function of a fuel-channel in which the fuel oil flows by a pump. At a time of passing the fuel oil, the pipe 300 is vibrated by variation (pulsing motion) of an oil pressure in the pipe 300 due to the pump. In this embodiment, the magnet assemblies 91 are mounted to the main unit 1 through the first sheet member 92 having the flexibility. Thus, it is possible to fixedly attach the power generator 100 to a curved surface (curved portion) of a vibrating body such as the pipe 300 shown in FIG. 10.

As explained above, in this embodiment, the first sheet member 92 has two types of the arm portions 922a, 922b. Thus, it is possible to stably and fixedly attach the power generator 100 to various vibrating bodies having various curvature radii in a cross-sectional view.

<Second Embodiment>

Next, description will be given to a power generator 100 according to the second embodiment of the present invention.

Figure 11:
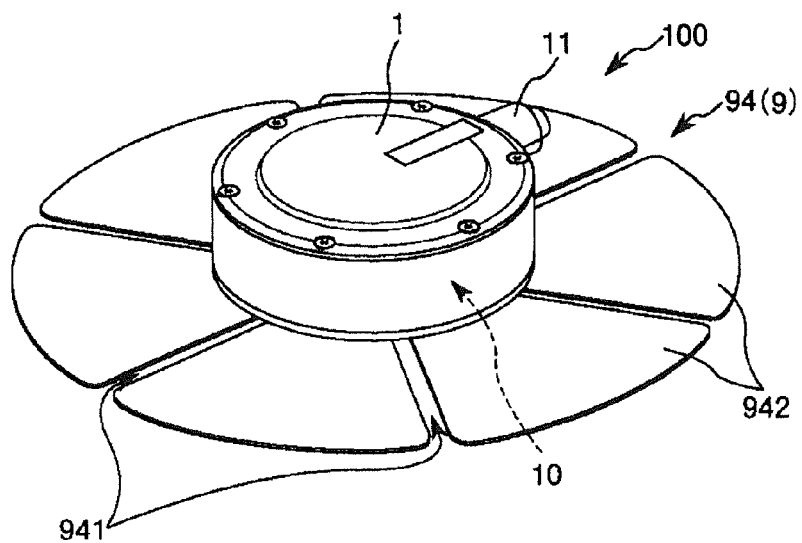
FIG. 11 is a perspective view showing a power generator according to a second embodiment of the present invention.
Figure 12:
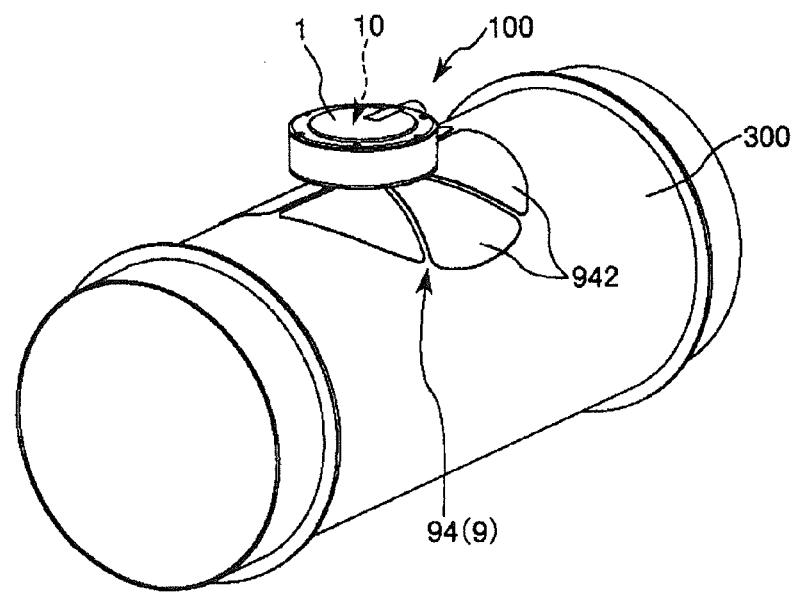
FIG. 12 is a perspective view showing the power generator shown in FIG. 11, which shows a state for use (attached state).

FIG. 11 is a perspective view showing the power generator 100 according to the second embodiment of the present invention. FIG. 12 is a perspective view showing the power generator 100 shown in FIG. 11, which shows a state for use (attached state). Hereinafter, an upper side in each of FIGS. 11 and 12 is referred to as "upper" or "upper side" and a lower side in each of FIGS. 11 and 12 is referred to as "lower" or "lower side".

Hereinafter, the power generator 100 according to the second embodiment will be described by placing emphasis on the points differing from the power generator 100 according to the first embodiment, with the same matters omitted from description. The power generator 100 according to the second embodiment has the same structure as the first embodiment except that the structure of the attachment 9 is modified.

The attachment 9 according to the second embodiment has a magnet sheet 94 and is configured to be deformed in the thickness direction of the base 23. In the magnet sheet 94, a plurality of slits 941 are formed so as to extend from a periphery of the magnet sheet 94 toward a central portion of the magnet sheet 94 on which the main unit 1 is fixed. Namely, the magnet sheet 94 has a plurality of fan-like portions 942 defined by the slits 941.

The attachment 9 according to this embodiment can also stably and fixedly attach the main unit 1 (the power generator 100) to the pipe 300 shown in FIG. 12 as well as the duct 200 shown in FIG. 8 because the magnet sheet 94 (fan-like portions 942) can be deformed according to the curved surface of the pipe 300. In particular, since the magnet sheet 94 has the plurality of slits 941, it is possible to prevent or suppress shearing stress from occurring in the magnet sheet while the vibrating body is vibrated. As a result, it is possible to prevent deterioration of adhesiveness between the magnet sheet 94 and the vibrating body and undesirable removing of the power generator 100 from the vibrating body.

The plurality of slits 941 are formed along with a circumferential direction of the magnet sheet 94 at substantially regular intervals. Thus, the plurality of fan-like portions 942 are also arranged along with the circumferential direction of the magnet sheet 94 at substantially regular intervals and have a size substantially identical to each other. This makes it possible to fixedly attach the main unit 1 to the vibrating body by utilizing an attraction force which is uniform in the circumferential direction of the magnet sheet 94. In addition, it is possible to prevent the power generator 100 from sliding in a specific direction. Namely, it is possible to keep the power generator 100 in an attached position on the vibrating body even in a case where the vibrating body is vibrated.

The magnet sheet 94 has a size allowing the periphery of the magnet sheet 94 to locate outside of the main unit 1 in the planer view when the power generator 100 is attached to a planation surface. Thus, it is possible to stably and fixedly attach the power generator 100 to the various vibrating bodies having various curvature radii in the cross-sectional view.

The magnet sheet 94 can be obtained by, for example, molding a material containing a magnet material and an elastomeric material (rubber material). Examples of the magnet material include an alnico magnet, a ferrite magnet, a neodymium magnet, a samarium-cobalt magnet and a samarium-cobalt magnet. Examples of the elastomeric material include the same material as the constituent material for the sheet member 93 explained above. Since the magnet sheet 94 contains such elastomeric material, the magnet sheet 94 can provide a function of preventing the main unit 1 from sliding relative to the vibrating body.

Figure 13:
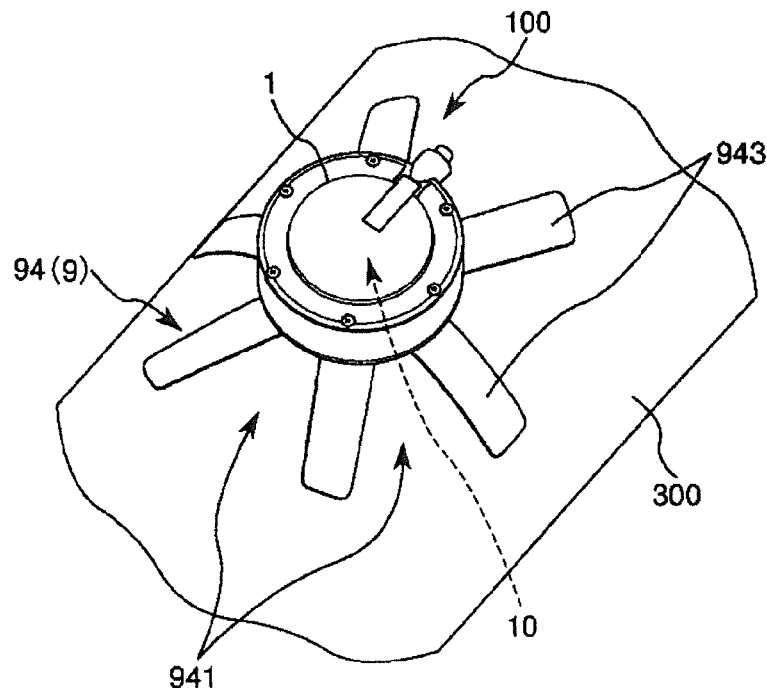
FIG. 13 is a perspective view showing another constructive example of a magnet sheet shown in FIG. 11.

The magnet sheet 94 may has a structure shown in FIG. 13. FIG. 13 is a perspective view showing another constructive example of the magnet sheet 94.

The magnet sheet 94 shown in FIG. 13 has a plurality of slits 941 each having a width gradually increasing toward the periphery of the magnet sheet 94. Namely, the magnet sheet 94 has a plurality of strip-shaped portions 943 defined by the slits 941. The magnet sheet 94 having such structure can also reliably and fixedly attach the main unit 1 (power generator 100) to the pipe 300 shown in FIG. 13 as well as the duct 200 shown in FIG. 8.

In the structure shown in FIG. 13, the width of each of the slits 941 gradually increases, but the width of each of the slits 941 may discontinuously increase in a phased manner or may keep an approximately constant value after gradually or discontinuously increasing.

<Third Embodiment>

Next, description will be given to a power generator 100 according to the third embodiment of the present invention.

Figure 14:
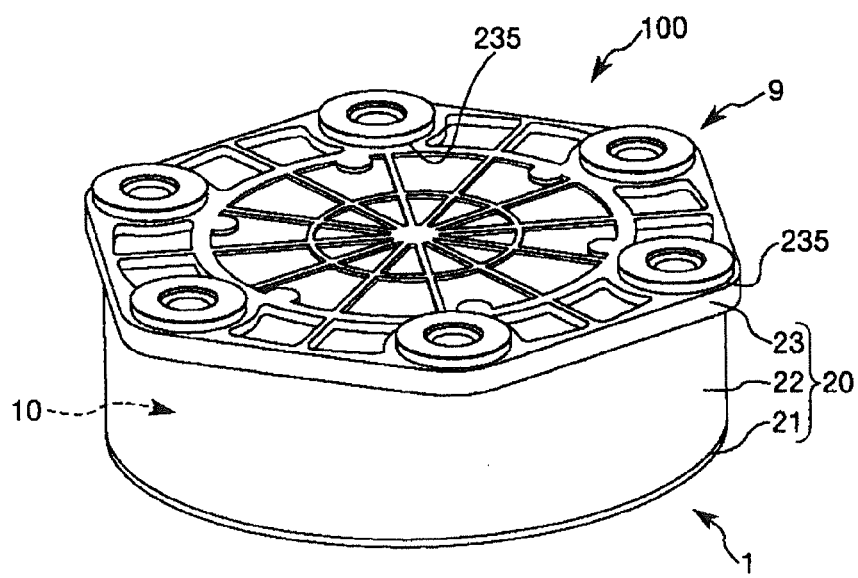
FIG. 14 is a perspective view (taken from a lower side) showing a power generator according to a third embodiment of the present invention.
Figure 15A:
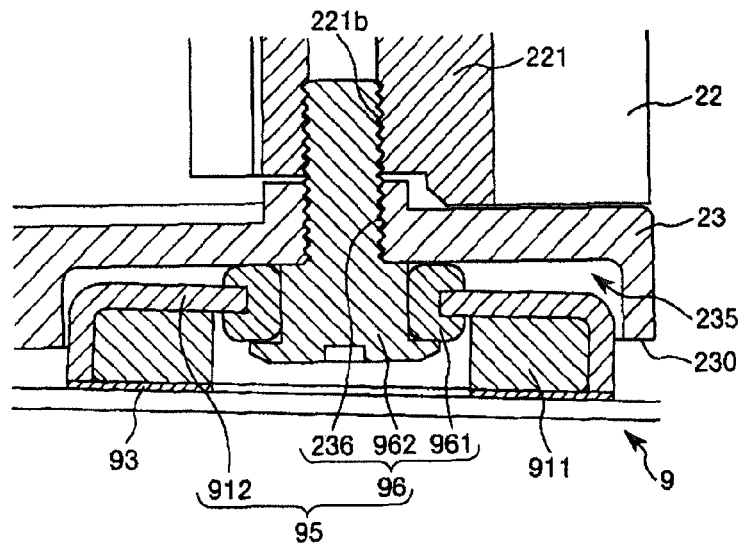
FIG. 15 is a view showing a structure of an attachment of the power generator shown in FIG. 14 (FIG. 15a is a vertical cross-sectional view and FIG. 15b is an exploded perspective view).
Figure 15B:
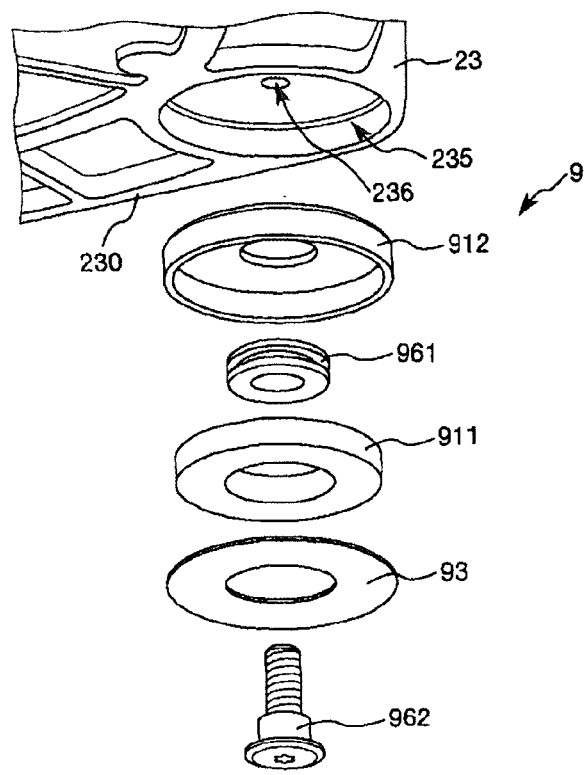

FIG. 14 is a perspective view (taken from a lower side) showing the power generator 100 according to the third embodiment of the present invention. FIG. 15 is a view showing a structure of an attachment 9 of the power generator 100 shown in FIG. 14 (FIG. 15a is a vertical cross-sectional view and FIG. 15b is an exploded perspective view). Hereinafter, an upper side in each of FIGS. 14 and 15 is referred to as "upper" or "upper side" and a lower side in each of FIGS. 14 and 15 is referred to as "lower" or "lower side".

Hereinafter, the power generator 100 according to the third embodiment will be described by placing emphasis on the points differing from the power generator 100 according to the first embodiment, with the same matters omitted from description. The power generator 100 according to the third embodiment has the same structure as the first embodiment except that the structure of the attachment 9 is modified.

The attachment 9 according to the third embodiment has a plurality of permanent magnets 911 disposed on the side of the lower surface 230 of the base 23 of the main unit 1, a mounting mechanism 95 for mounting the permanent magnets 911 to the base so that the permanent magnets 911 can be displaced in the thickness direction of the base 23 and second sheet members 93 respectively bonded to lower surfaces of the permanent magnets 911. When the power generator 100 is fixedly attached to the duct 200 shown in FIG. 9 and then the plate 201 on which the power generator 100 is fixedly attached is deformed, a mounting angle of each of the permanent magnets 911 is changed (tilted) according to the deformation of the plate 201 by a function of the mounting mechanism 95. This makes it possible to reliably keep an attached state of the main unit 1 (power generator 100) relative to the duct 200.

The mounting mechanism 95 has yokes (holding member) 912 respectively holding the permanent magnets 911 and fixation mechanisms 96 respectively fixing the yokes 912 to the base 23 so that the yokes 912 can be displaced in the thickness direction of the base 23. A plurality of concave portions 235 respectively for receiving the yokes 912 holding the permanent magnets 911 are formed on the lower surface 230 of the base 23 along with the periphery of the base. The concave portions 235 are arranged in the circumferential direction of the base 23 at substantially regular intervals (at regular angular-intervals of about 60 degree). Thus, the permanent magnets 911 are also arranged in the circumferential direction of the base 23 at substantially regular intervals.

This makes it possible to fixedly attach the main unit 1 (power generator 100) to the vibrating body by utilizing an attraction force which is uniform in the circumferential direction of the base 23. In addition, it is possible to prevent the power generator 100 from sliding in a specific direction. Namely, it is possible to keep the power generator 100 in an attached position on the vibrating body even in a case where the vibrating body is vibrated.

Each of the fixation mechanisms 96 according to this embodiment has an elastic ring (elastic body) 961 engaging with a periphery of the through-hole of the yoke 912, a screw 962 passing through the inner side of the elastic ring 961 (the through-hole of the yoke 912) and a threaded hole 236 formed in a center of the concave portion 235, into which the screw 962 is screwed. The screw 962 is formed so as not to allow a proximal end (head) of the screw 962 to protrude from the lower surface of the permanent magnet 911 when the screw 962 is screwed into the threaded hole 236. Examples of a constituent material for the elastic ring 961 include the same elastomeric material (rubber material) as the second sheet member 93.

Since the elastic ring 961 can be elastically deformed, the fixation mechanism 96 can allow the permanent magnets 911 to slope relative to the base 23 and to be displaced in the thickness direction of the base 23 (in the vertical direction). Therefore, it is possible to keep a clearance between the main unit 1 and the duct 200 (vibrating body) and a parallelism of the main unit 1 relative to the duct 200 suitably regardless of a curvature degree and an asperity of the plate 201 of the duct 200 (a surface to which the power generator 100 is attached). As a result, it is possible to stably and fixedly attach the power generator 100 to the duct 200.

In this case, the power generator 100 has a vibrating system (spring system) having a resonant frequency F3 determined by a spring constant of the elastic ring 961 and the mass of the power generator 100. Assuming that the power generator 100 can efficiently generate electric power by utilizing vibration having a vibrational frequency F1, the vibrational frequency F1 is substantially equal to a vibrational frequency F2 of the vibrating body. In a case where the vibrating body is the duct 200 for air-conditioning, the vibrational frequency F1 (F2) is in the range of about 10 to 50 Hz. By setting the resonant frequency F3 determined by the elastic ring 961 and the power generator 100 to be in the range of about 100 to 500 Hz, namely, by setting the resonant frequency F3 to be more than ten times the vibrational frequency F1 (F2), it is possible to prevent the vibrating system due to the spring constant of the elastic ring 961 and the mass of the power generator 100 from interfering the power generation of the power generator 100.

For example, in a case where the weight of the power generator 100 is 400 g, by setting the spring constant of the elastic ring 961 to be about 158 N/m, it is possible to adjust a resonant frequency F3 to be about 100 Hz. As just described, it is possible to adjust the resonant frequency F3 by appropriately selecting the spring constant of the elastic ring 961 determined by a shape and/or the constituent material of the elastic ring 961.

In the structure according to this embodiment, the numbers of the permanent magnets 911 and the elastic rings 961 may be increased. In this time, by setting the spring constant of each of the elastic rings 961 lower, it is possible to prevent the deterioration of the flexibility of the attachment 9 and keep the resonant frequency F3 high because the spring constant affecting the resonant frequency F3 is proportional to the number of the elastic rings 961.

As shown in FIG. 15a, the threaded hole 236 is formed in the base 23 passing through in the thickness direction of the base 23 so as to correspond to each of the boss sections 221 of the cylindrical portion 22. Thus, the periphery portion of the lower leaf spring 60L is held between the base 23 and the cylindrical portion 22 by screwing the screws 962 into the lower threaded holes 221b of the boss sections 221 passing through the through-holes 66 of the lower leaf spring 60L. This makes it possible to reduce the number or parts count for the power generator 100.

The second sheet member 93 is formed into an annular shape having an outer diameter substantially equal to that of the yoke 912 and an inner diameter substantially equal to that of the permanent magnet 911. Such second sheet member 93 is bonded to the permanent magnet 911 and the yoke 912 by, for example, an adhesive agent.

A constituent material of the screw 962 is not particularly limited to a specific material, but the screw 962 is preferably formed of a magnetic material. This makes it possible to improve the attraction force of the permanent magnet 911 by enhancing the magnetic loop due to the permanent magnet 911.

<Fourth Embodiment>

Next, description will be given to a power generator 100 according to the fourth embodiment of the present invention.

Figure 16A:
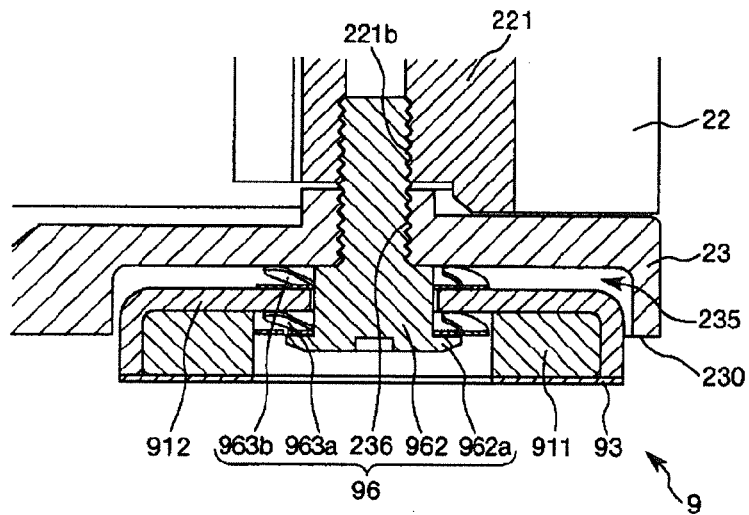
FIG. 16 is a view showing a structure of an attachment of a power generator according to a fourth embodiment of the present invention (FIG. 16a is a vertical cross-sectional view and FIG. 16b is an exploded perspective view).
Figure 16B:
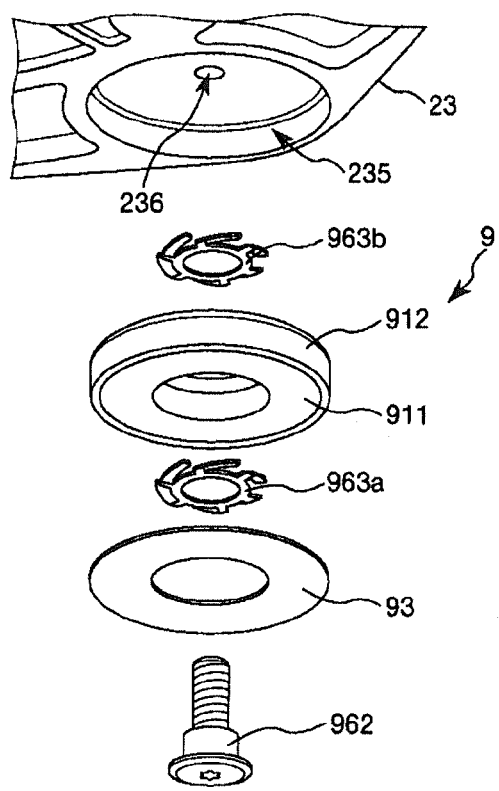

FIG. 16 is a view showing a structure of an attachment 9 of the power generator 100 according to the fourth embodiment of the present invention (FIG. 16*a* is a vertical cross-sectional view and FIG. 16*b* is an exploded perspective view). Hereinafter, an upper side in FIG. 16 is referred to as "upper" or "upper side" and a lower side in FIG. 16 is referred to as "lower" or "lower side".

Hereinafter, the power generator 100 according to the fourth embodiment will be described by placing emphasis on the points differing from the power generators 100 according to the first and third embodiments, with the same matters omitted from description. The power generator 100 according to the fourth embodiment has the same structure as the first and third embodiments except that the structure of the fixation mechanism 96 in the attachment 9 is modified.

The fixation mechanism 96 according to the fourth embodiment has a screw 962 with a head 962*a* having an outer diameter larger than a diameter of the through-hole formed in the yoke 912. Thus, the yoke 912 is loosely mounted to the base 23 of the main unit 1 so that the yoke 912 can be displaced in the thickness direction of the base 23. The fixation mechanism 96 has a first spring washer 963*a* disposed between the head 962*a* of the screw 962 and the yoke 912 and at the inside of the yoke 912 instead of the elastic ring 961, and a second spring washer 963*b* disposed between the yoke 912 and a bottom surface of the concave portion 235 formed on the base 23.

By using the spring washers 963*a*, 963*b* instead of the elastic ring 961, it is possible to efficiently displace the permanent magnet 911 relative to the base 23 in the thickness direction of the base 23 (in the vertical direction). Examples of a constituent material for the spring washers 963*a*, 963*b* include the same metallic material as the constituent material of the leaf springs 60U, 60L. In this embodiment, the first spring washer may be omitted.

The power generator 100 having the attachment 9 according to the fourth embodiment can also provide the same effect as the power generators 100 of the first and third embodiments. In particular, since the attachment 9 uses the spring washers 963*a*, 963*b* formed of the metallic material, it is possible to improve stability and durability of the attachment 9 compared with the attachment 9 according to the third embodiment.

<Fifth Embodiment>

Next, description will be given to a power generator 100 according to the fifth embodiment of the present invention.

Figure 17A:
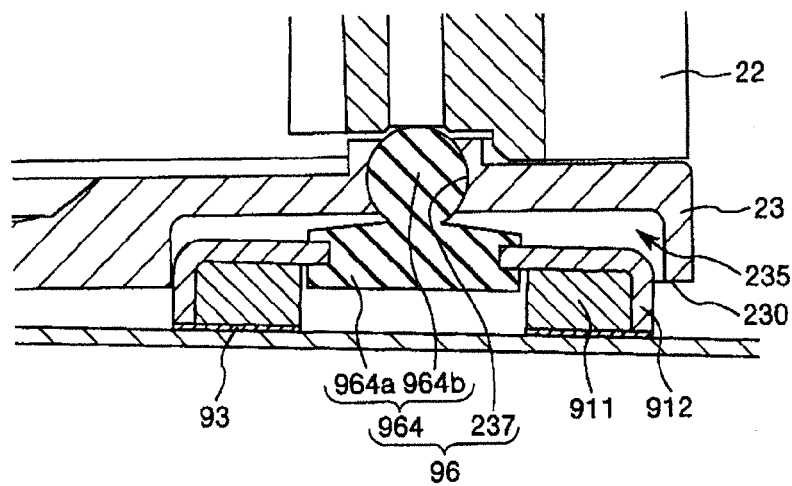
FIG. 17 is a view showing a structure of an attachment of a power generator according to a fifth embodiment of the present invention (FIG. 17a is a vertical cross-sectional view and FIG. 17b is an exploded perspective view).
Figure 17B:
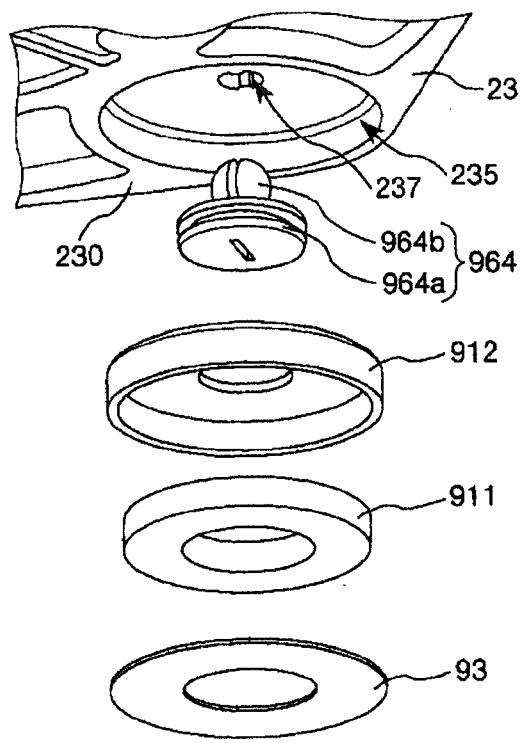

FIG. 17 is a view showing a structure of an attachment 9 of the power generator 100 according to the fifth embodiment of the present invention (FIG. 17*a* is a vertical cross-sectional view and FIG. 17*b* is an exploded perspective view). Hereinafter, an upper side in FIG. 17 is referred to as "upper" or "upper side" and a lower side in FIG. 17 is referred to as "lower" or "lower side".

Hereinafter, the power generator 100 according to the fifth embodiment will be described by placing emphasis on the points differing from the power generators 100 according to the first, third and fourth embodiments, with the same matters omitted from description. The power generator 100 according to the fifth embodiment has the same structure as the first, third and fourth embodiments except that the structure of the fixation mechanism 96 in the attachment 9 is modified.

The fixation mechanism 96 according to the fifth embodiment has a connecting member (joint) 964 including a connecting portion 964*a* connecting with the periphery of the through-hole formed in the yoke 912 and a spherical head 964*b* integrally formed with an upper side of the connecting portion 964*a*; and an engaging concave portion 237 formed in a central portion of the concave portion 235 of the base and pivotally engaged with the spherical head 964*b* of the connecting member 964.

By using the fixation mechanism 96 having such structure, it is possible to mount the permanent magnet 911 to the base 23 so that the permanent magnet 911 can be displaced (sloped) relative to the base 23 without using the elastic ring (elastic body) 961. Since the fixation mechanism 96 has no elastic body such as the elastic ring (elastic body) 961, it is possible to prevent deterioration of the fixation mechanism 96 due to aged deterioration, temperature and/or humidity, thereby improving durability of the attachment 9.

A constituent material of the connecting member 964 is not particularly limited to a specific material, but a thermoplastic resin is preferably used. Examples of the thermoplastic resin include a polyacetal (POM), a polyamide (PA), an acrylonitrile butadiene styrene copolymer (ABS), a polypropylene (PP), a polycarbonate (PC) and a combination of two or more of the above resins.

The spherical head 964*b* of the connecting member 964 has a silt for facilitating a process of mounting the spherical head 964*b* to the engaging concave portion 237.

The power generator 100 having the attachment 9 according to the fifth embodiment can also provide the same effect as the power generators 100 of the first and third embodiments.

Figure 18:
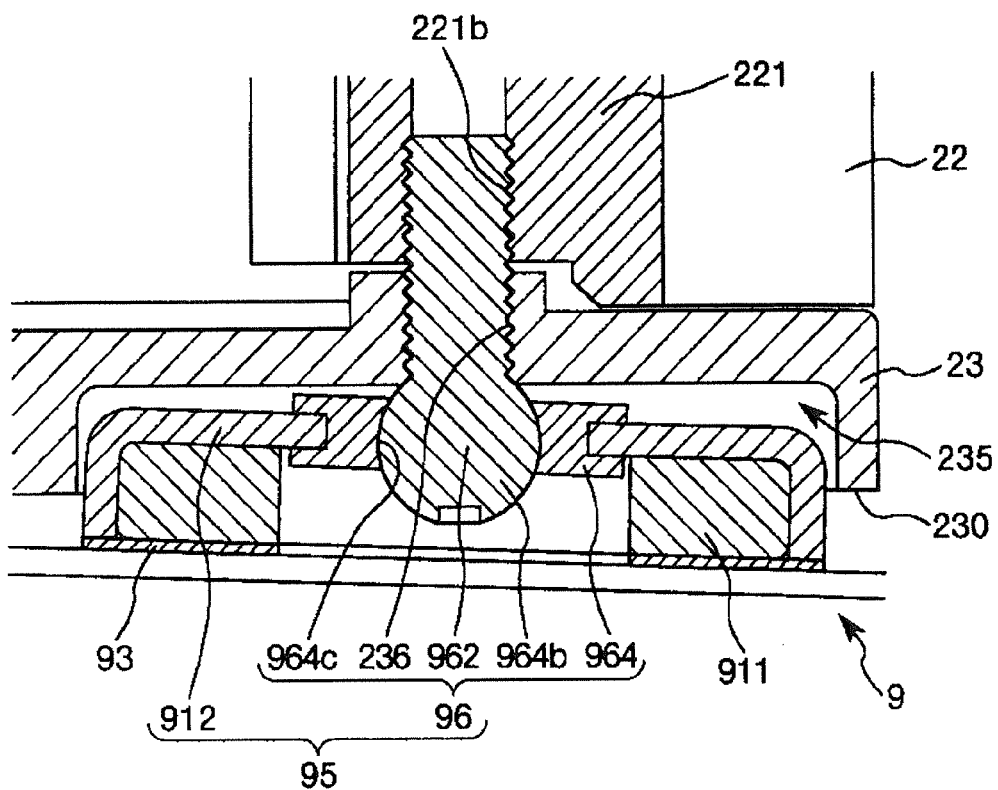
FIG. 18 is a vertical cross-sectional view showing another constructive example of a fixation mechanism utilizing an engagement between a spherical head and an engaging concave portion.

The fixation mechanism 96 according to the fifth embodiment may have a structure shown in FIG. 18. FIG. 18 is a vertical cross-sectional view showing another constructive example of the fixation mechanism 96 utilizing an engagement between a spherical head 964*b* and an engaging concave portion 964*c*.

The fixation mechanism 96 shown in FIG. 18 has a connecting member 964 in which the engaging concave portion 964*c* engaged with the periphery of the through-hole formed in the yoke 912 is formed, a screw 962 including the spherical head 964*b* and the threaded hole 236 into which the screw 962 is screwed.

In the power generator 100 explained above, the power generating unit 10 has an electromagnetic induction device using the permanent magnet 31 and the coil 40, but the power generating unit 10 may has an electret device, a piezoelectric device or a magnetostrictor.

In this description, although the duct 200 and the pipe 300 are explained as examples of the vibrating body, the present invention is not limited thereto. Examples of the vibrating body include a transportation (such as a freight train, an automobile and a back of truck), a crosstie for railroad, a wall panel of an express highway or a tunnel, a bridge, a vibrating device such as a pump and a turbine. The power generating system of the present invention can be constructed by fixedly attaching the power generator 100 to a surface formed of a magnetic material in such vibrating body.

Although the power generator and the power generating system of the present invention have been described with reference to the accompanying drawings, the present invention is not limited thereto. In the power generator and the power generating system, the configuration of each component may possibly be replaced by other arbitrary configurations having equivalent functions. It may also be possible to add other optional components to the present invention.

For example, it may also be possible to combine the configurations according to the first embodiment to the fifth embodiments of the present invention in an appropriate manner.

What is claimed is:

1. A power generator configured to be used in a state that the power generator is fixedly attached to a vibrating body formed of a magnetic material, the power generator comprising:
a main unit including a power generating unit configured to generate electric power by utilizing vibration and a support board having one surface on which the power generating unit is supported and another surface opposed to the one surface; and
at least one permanent magnet disposed on the side of the other surface of the support board so that the permanent magnet can be displaced or deformed in a thickness direction of the support board,
wherein when the main unit is fixedly attached to the vibrating body through an attachment including the permanent magnet, the main unit is configured to generate the electric power by utilizing vibration of the vibrating body.

2. The power generator claimed in claim 1, wherein the vibrating body has a deformable plate-like portion formed of the magnetic material,
wherein the vibrating body is configured to be vibrated by deformation of the plate-like portion, and
wherein the power generator is used in a state that the power generator is fixedly attached to the plate-like portion of the vibrating body.

3. The power generator claimed in claim 1, wherein an attraction force between the permanent magnet and the vibrating body is larger than a weight of the power generator.

4. The power generator claimed in claim 1, wherein the attachment includes a mounting mechanism for mounting the permanent magnet to the other surface of the support board so that the permanent magnet can be displaced in the thickness direction of the support board.

5. The power generator claimed in claim 4, wherein the mounting mechanism has flexibility, and
wherein the mounting mechanism has a sheet member for holding the permanent magnet and a yoke disposed between the sheet member and the permanent magnet to fix the permanent magnet relative to the sheet member.

6. The power generator claimed in claim 5, wherein the vibrating body has a curved portion, and
wherein the power generator is used in a state that the power generator is fixedly attached to the curved portion of the vibrating body by using the permanent magnet.

7. The power generator claimed in claim 5, wherein the at least one permanent magnet includes a plurality of permanent magnets, and
wherein the sheet member has a fixed portion fixed to the other surface of the support board and a plurality of arm portions respectively having one end portion integrally formed with the fixed portion, another end portion opposite to the one end portion so as to outwardly extend from the fixed portion and holding portions holding the permanent magnets on the other end portions.

8. The power generator claimed in claim 7, wherein each of the arm portions has a length allowing the holding portions of the arm portions to locate outside of the main unit in a planer view when the power generator is attached to a planation surface.

9. The power generator claimed in claim 7, wherein the arm portions include a plurality of first arm portions respectively having a first length and a plurality of second arm portions respectively having a second length shorter than the first length of each of the first arm portions.

10. The power generator claimed in claim 9, wherein the arm portions are configured so that each of the second arm portions is located between the first arm portions.

11. The power generator claimed in claim 4, wherein the mounting mechanism has a holding portion holding the permanent magnet and a fixation mechanism fixing the holding portion on the other surface of the support board in a state that the holding portion can be displaced relative to the support board in the thickness direction of the support board.

12. The power generator claimed in claim 11, wherein a through-hole is formed in the holding portion,
wherein the fixation mechanism has a male screw and a female screw formed in the support board so as to be screwed with the male screw through the through-hole, and
wherein the fixation mechanism is configured to loosely fit the holding portion relative to the support board.

13. The power generator claimed in claim 12, wherein the fixation mechanism further has an elastic body disposed between the holding portion and the support board.

14. The power generator claimed in claim 12, wherein the main unit further has a cylindrical portion provided on the side of the one surface of the support board so as to surround the power generating unit, and
wherein a female screw configured to be screwed with the male screw is formed on the cylindrical portion.

15. The power generator claimed in claim 11, wherein the fixation mechanism has a spherical head formed at one side of the support board and the holding portion and an engaging concave portion formed at the other side of the support board and the holding portion and configured to be pivotally engaged with the spherical head.

16. The power generator claimed in claim 11, wherein the at least one permanent magnet includes a plurality of permanent magnets, and
wherein the permanent magnets are arranged along with an outer periphery of the support board.

17. The power generator claimed in claim 4, wherein the at least one permanent magnet includes three permanent magnets arranged so as to be rotationally symmetric with each other.

18. The power generator claimed in claim 4, further comprising a sheet member provided on one side of the permanent magnet opposed to another side of the permanent magnet facing to the main unit and having a function of preventing the main unit from being slid relative to the vibrating body.

19. The power generator claimed in claim 1, wherein the other surface of the support board is a curved convex surface.

20. A power generating system comprising:
the power generator claimed in claim 1; and
a vibrating body which the power generator is fixedly attached to, the vibrating body is formed of a magnetic material.

* * * * *

UNITED STATES PATENT AND TRADEMARK OFFICE
CERTIFICATE OF CORRECTION

PATENT NO. : 9,252,648 B2
APPLICATION NO. : 14/062543
DATED : February 2, 2016
INVENTOR(S) : Kenichi Furukawa et al.

It is certified that error appears in the above-identified patent and that said Letters Patent is hereby corrected as shown below:

Specification

In column 10, line 58, replace "$\omega_t$" with -- $\omega_2$ --.

Signed and Sealed this
Tenth Day of May, 2016

Michelle K. Lee
*Director of the United States Patent and Trademark Office*